US009396338B2

(12) United States Patent
Cabrera et al.

(10) Patent No.: US 9,396,338 B2
(45) Date of Patent: Jul. 19, 2016

(54) METHOD AND SYSTEM FOR PROVIDING A SECURE SECRETS PROXY

(71) Applicant: Intuit Inc., Mountain View, CA (US)

(72) Inventors: Luis Felipe Cabrera, Bellevue, WA (US); M. Shannon Lietz, San Marcos, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 14/054,450

(22) Filed: Oct. 15, 2013

(65) Prior Publication Data

US 2015/0106620 A1    Apr. 16, 2015

(51) Int. Cl.
*H04L 9/32* (2006.01)
*G06F 21/60* (2013.01)
*H04L 29/06* (2006.01)

(52) U.S. Cl.
CPC .............. *G06F 21/602* (2013.01); *H04L 63/00* (2013.01)

(58) Field of Classification Search
CPC ....... G06F 21/51; G06F 21/52; G06F 21/602; G06N 999/005
See application file for complete search history.

(56) References Cited

U.S. PATENT DOCUMENTS

| | | | |
|---|---|---|---|
| 5,003,596 A | 3/1991 | Wood | |
| 6,157,723 A | 12/2000 | Schultz | |
| 6,324,648 B1 | 11/2001 | Grantges, Jr. | |
| 6,889,210 B1 | 5/2005 | Vainstein | |
| 6,981,041 B2 | 12/2005 | Araujo et al. | |
| 6,996,716 B1 | 2/2006 | Hsu | |
| 7,178,033 B1 | 2/2007 | Garcia | |
| 7,336,790 B1 | 2/2008 | Caronni et al. | |
| 7,380,120 B1 | 5/2008 | Garcia | |
| 7,434,045 B1 | 10/2008 | Enderwick et al. | |
| 7,546,629 B2 | 6/2009 | Albert et al. | |
| 7,715,565 B2 | 5/2010 | Kimmel et al. | |

(Continued)

FOREIGN PATENT DOCUMENTS

| | | |
|---|---|---|
| EP | 0906677 | 1/1998 |
| EP | 2645673 | 10/2013 |

(Continued)

OTHER PUBLICATIONS

Cabrera et al., "Method and System for Distributing Secrets," U.S. Appl. No. 14/053,488, filed Oct. 14, 2013.

(Continued)

*Primary Examiner* — Techane Gergiso
(74) *Attorney, Agent, or Firm* — Hawley Troxell Ennis & Hawley LLP; Philip McKay

(57) ABSTRACT

A secure secrets proxy is instantiated in a first computing environment and includes secure secrets proxy authentication data for identifying itself to a secrets distribution management system in a second computing environment as a trusted virtual asset to receive and cache secrets data in a secure secrets cache outside the second computing environment. The secure secrets proxy requests one or more secrets to be cached and is then provided data representing the requested secrets in the secure secrets cache. The secure secrets proxy then receives secrets application request data from a second virtual asset instantiated in the first computing environment requesting one or more secrets be applied to second virtual asset data. The secure secrets proxy then obtains the required secrets from the secure secrets cache and coordinates the application of the secrets to the second virtual asset data.

21 Claims, 5 Drawing Sheets

(56) References Cited

U.S. PATENT DOCUMENTS

| | | | |
|---|---|---|---|
| 7,739,501 B2 | 6/2010 | Kimmel et al. | |
| 7,983,423 B1 | 7/2011 | Agarwal et al. | |
| 8,095,960 B2 | 1/2012 | Boogert et al. | |
| 8,316,237 B1 | 11/2012 | Felsher et al. | |
| 8,352,999 B1* | 1/2013 | Zhan | H04L 63/083 713/165 |
| 8,498,941 B2 | 7/2013 | Felsher | |
| 8,560,857 B2* | 10/2013 | Munetoh | G06F 21/52 713/167 |
| 8,656,189 B2 | 2/2014 | Orsini et al. | |
| 8,700,906 B2 | 4/2014 | Kamara et al. | |
| 8,826,013 B1 | 9/2014 | Kodukula et al. | |
| 8,880,882 B2 | 11/2014 | Kulkarni et al. | |
| 2002/0023065 A1 | 2/2002 | Frelechoux et al. | |
| 2004/0210591 A1* | 10/2004 | Hirschfeld et al. | 707/100 |
| 2005/0138110 A1 | 6/2005 | Redlich et al. | |
| 2006/0062238 A1 | 3/2006 | Mahendran et al. | |
| 2006/0215839 A1 | 9/2006 | Augenstein et al. | |
| 2006/0291664 A1 | 12/2006 | Suarez et al. | |
| 2007/0156781 A1 | 7/2007 | Kapoor et al. | |
| 2007/0195960 A1 | 8/2007 | Golman et al. | |
| 2007/0276931 A1 | 11/2007 | Mahdavi et al. | |
| 2008/0013569 A1 | 1/2008 | Boren | |
| 2008/0072309 A1* | 3/2008 | Kleinsteiber | H04L 63/08 726/14 |
| 2008/0083036 A1 | 4/2008 | Ozzie et al. | |
| 2008/0098392 A1 | 4/2008 | Wipfel et al. | |
| 2008/0109491 A1 | 5/2008 | Gupta | |
| 2008/0319909 A1 | 12/2008 | Perkins et al. | |
| 2009/0092252 A1 | 4/2009 | Noll et al. | |
| 2009/0103724 A1 | 4/2009 | Tamai | |
| 2009/0204631 A1 | 8/2009 | Pomroy et al. | |
| 2009/0287837 A1 | 11/2009 | Felsher | |
| 2010/0082991 A1 | 4/2010 | Baldwin et al. | |
| 2010/0189251 A1 | 7/2010 | Curren | |
| 2011/0004752 A1 | 1/2011 | Shukla | |
| 2011/0022812 A1* | 1/2011 | van der Linden | G06F 9/5077 711/163 |
| 2011/0093707 A1 | 4/2011 | Green et al. | |
| 2011/0113236 A1 | 5/2011 | Chenard et al. | |
| 2011/0158406 A1 | 6/2011 | Marcia et al. | |
| 2011/0188651 A1 | 8/2011 | Iswandhi et al. | |
| 2011/0191595 A1* | 8/2011 | Damian | H04L 9/06 713/189 |
| 2011/0219035 A1 | 9/2011 | Korsunsky et al. | |
| 2011/0277027 A1* | 11/2011 | Hayton et al. | 726/8 |
| 2012/0131189 A1 | 5/2012 | Smart et al. | |
| 2012/0185913 A1 | 7/2012 | Martinez et al. | |
| 2012/0204032 A1* | 8/2012 | Wilkins | H04L 9/006 713/170 |
| 2012/0303776 A1 | 11/2012 | Ferris | |
| 2012/0311564 A1* | 12/2012 | Khalid | 718/1 |
| 2013/0019284 A1 | 1/2013 | Pacyga et al. | |
| 2013/0060825 A1 | 3/2013 | Farcasiu et al. | |
| 2013/0097706 A1* | 4/2013 | Titonis et al. | 726/24 |
| 2013/0104213 A1 | 4/2013 | Nandakumar | |
| 2013/0125247 A1 | 5/2013 | Sprague et al. | |
| 2013/0204849 A1 | 8/2013 | Chacko | |
| 2013/0219456 A1 | 8/2013 | Sharma et al. | |
| 2013/0254539 A1 | 9/2013 | Auradkar et al. | |
| 2013/0346558 A1 | 12/2013 | Khalidi et al. | |
| 2014/0007178 A1 | 1/2014 | Gillum et al. | |
| 2014/0007239 A1* | 1/2014 | Sharpe et al. | 726/24 |
| 2014/0026179 A1 | 1/2014 | Devarajan et al. | |
| 2014/0068732 A1 | 3/2014 | Hinton et al. | |
| 2014/0074637 A1* | 3/2014 | Hammad | 705/21 |
| 2014/0075499 A1 | 3/2014 | Arun et al. | |
| 2014/0165134 A1 | 6/2014 | Goldschlag et al. | |
| 2014/0244585 A1 | 8/2014 | Sivasubramanian et al. | |
| 2014/0282840 A1* | 9/2014 | Guinan | H04L 63/20 726/1 |
| 2014/0283010 A1 | 9/2014 | Rutkowski et al. | |
| 2014/0330869 A1 | 11/2014 | Factor et al. | |

FOREIGN PATENT DOCUMENTS

| | | |
|---|---|---|
| GB | 2477682 | 11/2009 |
| GB | 2524632 | 1/2015 |
| WO | WO 2010/144735 | 12/2010 |

OTHER PUBLICATIONS

Weaver et al., "Method and System for Automatically Managing Secret Application and Maintenance," U.S. Appl. No. 14/069,921, filed Nov. 1, 2013.

Lietz et al., "Method and System for Automatically Managing Secure Communications in Multiple Communications Jurisdiction Zones," U.S. Appl. No. 14/070,168, filed Nov. 1, 2013.

Cabrera et al., "Method and System for Automatically Managing Secrets in Multiple Data Security Jurisdiction Zones," U.S. Appl. No. 14/073,110, filed Nov. 6, 2013.

Lietz et al., "Method and System for Accommodating Communications Channels Using Different Secure Communications Protocols," U.S. Appl. No. 14/215,432, filed Mar. 17, 2014.

Lietz et al., "Method and Apparatus to Rotate Data Encryption Keys in Databases with No Down Time," U.S. Appl. No. 14/263,808, filed Apr. 28, 2014.

Cabrera et al., "Method and Apparatus for Multi-Tenancy Secrets Management," U.S. Appl. No. 14/265,930, filed Apr. 30, 2014.

Reddy et al., "Security Architecture of Cloud Computing," *International Journal of Engineering Science and Technology (IJEST)*, vol. 3, No. 9, Sep. 9, 2011, pp. 7149-7155.

* cited by examiner

METHOD AND SYSTEM FOR PROVIDING A SECURE SECRETS PROXY

BACKGROUND

As various forms of distributed computing, such as cloud computing, have come to dominate the computing landscape, security has become a bottleneck issue that currently prevents the complete migration of various capabilities and systems associated with sensitive data, such as financial data, to cloud-based computing environments, and/or other distributive computing models. This is because many owners and operators of data centers that provide access to data and other resources are extremely hesitant to allow their data and resources to be accessed, processed, and/or otherwise used, by virtual assets, such as virtual machine and server instances in the cloud.

One mechanism historically used to control access to the data and other resources is the use/application of secrets such as, but not limited to, passwords, encryption keys, and digital certificates, to control and authenticate entities desiring to access various types of data and resources.

There is little doubt the use of secrets is an effective method for ensuring that data and other resources are only accessible by an authorized entity. However, the management and selective application of secrets in a timely manner is a complicated and time consuming task with significant latencies occurring as the secrets data is obtained from secrets distribution systems, often existing in a computing environment, such as a data center, that is remote and distinct from the computing environment, such as a cloud, where the virtual assets needing the secrets exist, and where the secrets are typically used/applied. This is particularly problematic given that, currently, secrets management and processing is largely a manual process.

What is needed is a method and system to manage secrets data, and the data and objects acted on, or associated with, the secrets data, that is highly automated, minimizes latencies, and can operate in multiple environments, without compromising the secrets, the resources accessed using the secrets, and/or any data or objects associated with the secrets.

SUMMARY

In accordance with one embodiment, a method and system for providing a secure secrets proxy includes providing a secure secrets proxy in a first computing environment. In one embodiment, the secure secrets proxy is a virtual asset instantiated in the first computing environment. In one embodiment, the secure secrets proxy includes secure secrets proxy authentication data for identifying the secure secrets proxy as a trusted virtual asset in the first computing environment.

In one embodiment, a secrets distribution management system is provided, in one embodiment, in a second computing environment. In one embodiment, the secrets distribution management system has access to secrets data representing one or more secrets and controls the distribution of the one or more secrets in accordance with one or more secrets distribution policies. In one embodiment, the secure secrets proxy provides the secure secrets proxy authentication data to the secrets distribution management system and the secrets distribution management system authenticates the secure secrets proxy and identifies the secure secrets proxy as a trusted virtual asset eligible to cache secrets data in a secure secrets cache outside the second computing environment.

In one embodiment, based, in part, on the type of computing environment represented by the first computing environment, the secure secrets proxy generates cache secrets request data representing a request for data representing one or more requested secrets to be cached in the secure secrets cache. In one embodiment, the secure secrets proxy provides the cache secrets request data to the secrets distribution management system and, in response to the cache secrets request data, the secrets distribution management system provides data representing the one or more requested secrets to the secure secrets cache.

In one embodiment, a second virtual asset, in one embodiment, instantiated in the first computing environment, generates secrets application request data requesting that one or more secrets be applied to second virtual asset data generated by, or through, or otherwise associated with, the second virtual asset. In one embodiment, the secure secrets proxy receives the secrets application request data and then the secure secrets proxy authenticates the second virtual asset. In one embodiment, the secure secrets proxy then obtains the secrets associated with the secrets application request data from the secure secrets cache. In one embodiment, the secure secrets proxy then coordinates the application of the secrets associated with the secrets application request data to the second virtual asset data.

Figure 1:
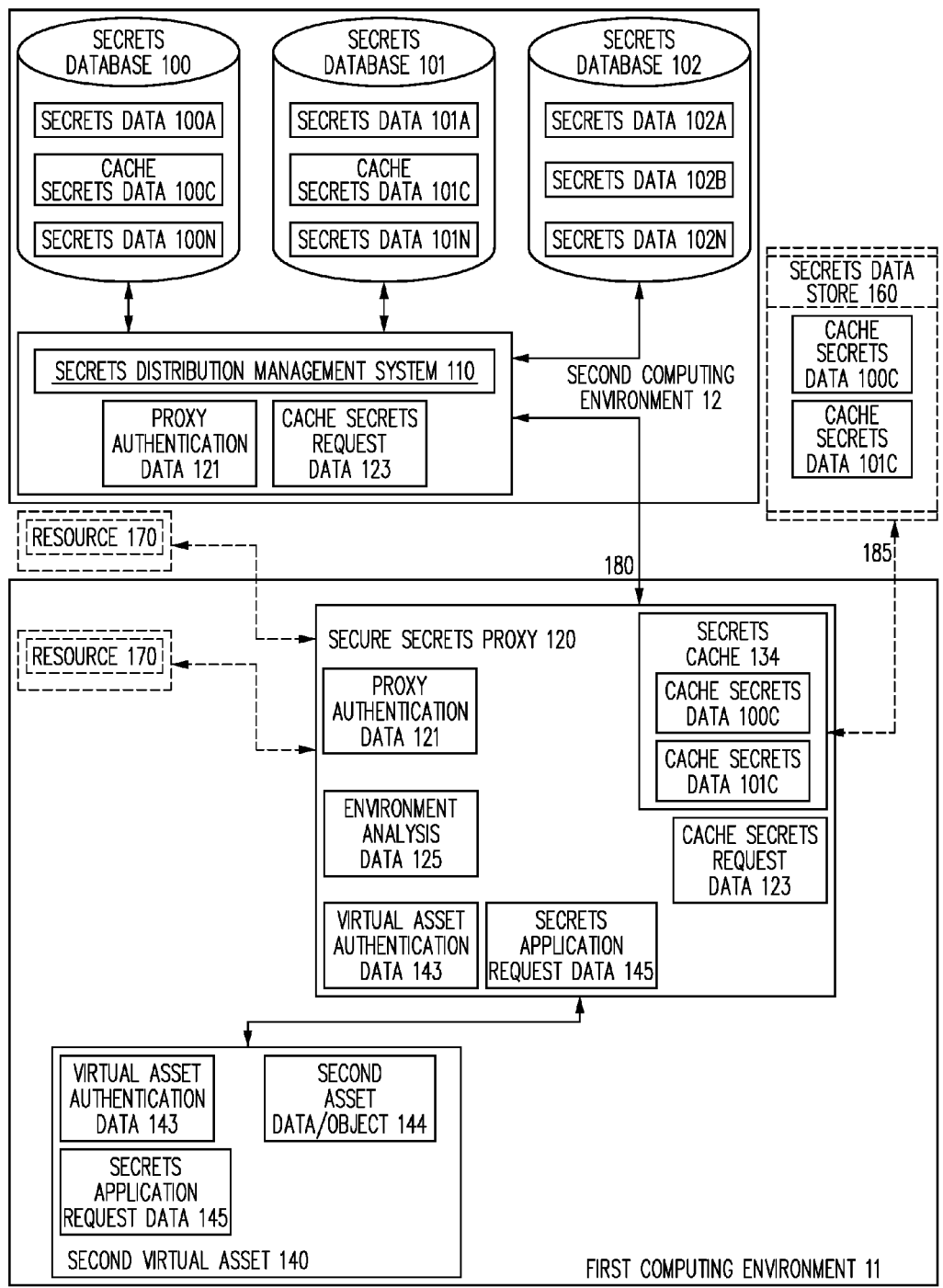
FIG. 1 is a functional block diagram showing the interaction of various elements for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for providing a secure secrets proxy includes a process for providing a secure secrets proxy implemented, at least in part, by one or more computing systems.

As used herein, the term "computing system", includes, but is not limited to, a server computing system; a workstation; a desktop computing system; a database system or storage cluster; a switching system; a router; any hardware system; any communications systems; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the process for providing a secure secrets proxy are logically or physically located, and/or associated with, two or more computing environments. As used herein, the term "computing environment" includes, but is not limited to, a logical or physical grouping of connected or networked computing systems using the same infrastructure and systems such as, but not limited to, hardware systems, software systems, and networking/communications systems. Typically, computing environments are either known environments, e.g., "trusted" environments, or unknown, e.g., "untrusted" environments. Typically trusted computing environments are those where the components, infrastructure, communication and networking systems, and security systems associated with the computing systems making up the trusted computing environment, are either under the control of, or known to, a party. In contrast, unknown, or untrusted computing environments are environments and systems where the components, infrastructure, communication and networking systems, and security systems implemented and associated with the computing systems making up the untrusted computing environment, are not under the control of, and/or are not known by, a party, and/or are dynamically configured with new elements capable of being added that are unknown to the party.

Examples of trusted computing environments include the components making up data centers associated with, and/or controlled by, a party and/or any computing systems, and/or networks of computing systems, associated with, known by, and/or controlled by, a party. Examples of untrusted computing environments include, but are not limited to, public networks, such as the Internet, various cloud-based computing environments, and various other forms of distributed computing systems.

It is often the case that a party desires to transfer data to, and from, a first computing environment that is an untrusted computing environment, such as, but not limited to, a public cloud, a virtual private cloud, and a trusted computing environment, such as, but not limited to, networks of computing systems in a data center controlled by, and/or associated with, the party. However, in other situations a party may wish to transfer data between two trusted computing environments, and/or two untrusted computing environments.

In one embodiment, two or more computing systems, and/or two or more computing environments, are connected by one or more communications channels, and/or distributed computing system networks, such as, but not limited to: a public cloud; a private cloud; a virtual private cloud (VPN); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

FIG. 1 is a functional diagram of the interaction of various elements associated with one embodiment of the method and system for providing a secure secrets proxy discussed herein. Of particular note, the various elements in FIG. 1 are shown for illustrative purposes as being associated with specific computing environments, such as computing environment 11 and computing environment 12. However, the exemplary placement of the various elements within these environments and systems in FIG. 1 is made for illustrative purposes only and, in various embodiments, any individual element shown in FIG. 1, or combination of elements shown in FIG. 1, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center keeping or accessing the secrets data, a party and/or entity providing all or a portion of a cloud-based computing environment, the owner or a provider of a service, the owner or provider of one or more resources accessible using the secrets, and/or any other party and/or entity providing one or more functions, and/or any other party and/or entity as discussed herein, and/or as known in the art at the time of filing, and/or as made known after the time of filing.

In accordance with one embodiment, a secure secrets proxy is provided in a first computing environment.

In one embodiment, the secure secrets proxy is a virtual asset instantiated in the first computing environment. In one embodiment, as a specific illustrative example, the secure secrets proxy is a virtual machine, or server instance, instantiated in a cloud computing environment.

In one embodiment, the secure secrets proxy is instantiated in the first computing environment using a virtual machine template through which the creator of the secure secrets proxy can create operational logic and assign resources and attributes to the secure secrets proxy. In one embodiment, the virtual machine template includes provided logic for generating and/or processing secure secrets proxy authentication data associated with the secure secrets proxy and identifying the secure secrets proxy as a trusted agent generated within the first computing environment.

In one embodiment, the secure secrets proxy authentication data includes one or more additional, or alternative, challenges, and/or responses to challenges, that are used to authenticate the secure secrets proxy and to further identify the secure secrets proxy as a trusted agent for receiving and/or caching one or more secrets. In one embodiment, the secure secrets proxy authentication data is used or provided to other entities as part of the bootstrap handshake with those entities at the time the secure secrets proxy is first instantiated in the first computing environment.

As discussed below, in one embodiment, the secure secrets proxy authentication data is provided to a secrets distribution management system in a second computing environment in order to authenticate the secure secrets proxy and identify the secure secrets proxy as a trusted asset in the first computing environment eligible to receive, and/or cache, one or more secrets. In one embodiment, the secure secrets proxy authentication data is provided in addition to standard authentication procedures performed with an initial set of credentials.

In one embodiment, the one or more additional or alternative challenges included in the secure secrets proxy authentication data includes automatically loading specified datum from a specified storage service onto the secure secrets proxy and then providing the specified datum to an entity needing to confirm the identity of the secure secrets proxy as a trusted virtual asset eligible to receive and/or cache secrets.

In one embodiment, the one or more additional or alternative challenges included in the secure secrets proxy authentication data includes data for reading or obtaining hardware identification data indicating the identification of the underlying hardware on which the secure secrets proxy virtual machine is running. In one embodiment, the hardware identification data is then confirmed by comparing it with data obtained via other systems, such as a cloud provider control plane.

In one embodiment, the one or more additional or alternative challenges included in the secure secrets proxy authentication data includes any authentications, challenges, or combination of authentications and/or challenges desired, and/or as discussed herein, and/or as known in the art/available at the time of filing, and/or as developed/made available after the time of filing.

Shown in FIG. 1 is secure secrets proxy 120, including secure secrets proxy authentication data, represented by proxy authentication data 121 in FIG. 1. In the specific illustrative example of FIG. 1, secure secrets proxy 120 is implemented in first computing environment 11.

Figure 2:
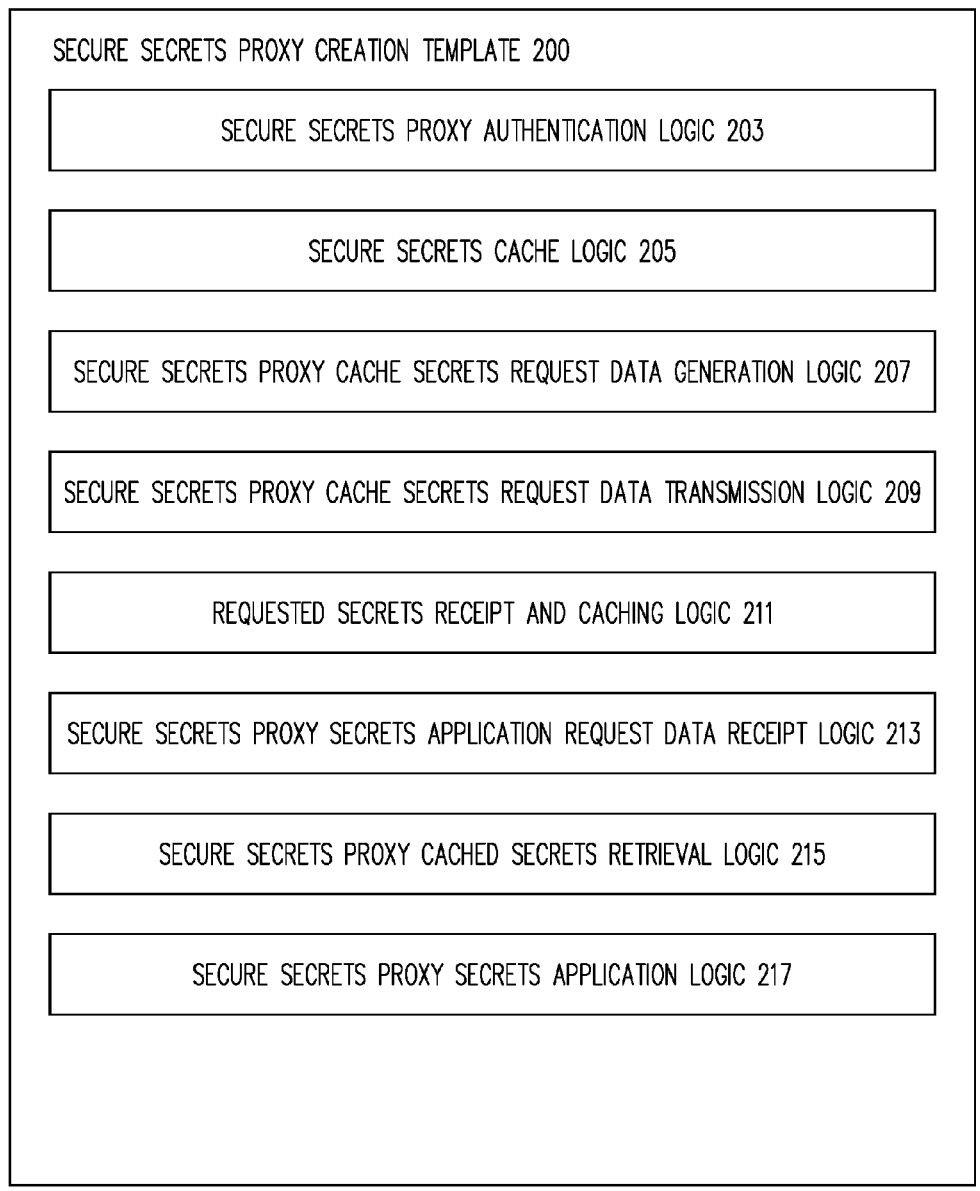
FIG. 2 is a functional diagram of a secure secrets proxy creation template in accordance with one embodiment.

FIG. 2 is a functional diagram of part of the operational logic of a secure secrets proxy creation template 200 for creating a secure secrets proxy, such as secure secrets proxy 120 of FIG. 1, in accordance with one embodiment.

As seen in FIG. 2, in one embodiment, secure secrets proxy creation template 200 includes secure secrets proxy authentication logic 203 for generating and/or processing secure secrets proxy authentication data associated with secure secrets proxy 120 and identifying secure secrets proxy 120 as a trusted agent generated within the first computing environment.

As seen in FIG. 2, in one embodiment, secure secrets proxy creation template 200 includes secure secrets cache logic 205 to provide a secure secrets cache or a secrets data store where, as discussed below, one or more requested secrets can be stored in the first computing environment.

As seen in FIG. 2, in one embodiment, secure secrets proxy creation template 200 includes secure secrets proxy cache secrets request data generation logic 207 for, as discussed below, generating cache secrets request data representing a request for data representing one or more requested secrets to be cached in the secure secrets cache.

As seen in FIG. 2, in one embodiment, secure secrets proxy creation template 200 includes secure secrets proxy cache secrets request data transmission logic 209 for, as discussed below, providing the cache secrets request data to a secrets distribution management system.

As seen in FIG. 2, in one embodiment, secure secrets proxy creation template 200 includes requested secrets receipt and caching logic 211 for, as discussed below, receiving and storing data representing the one or more requested secrets to be cached in the secure secrets cache.

As seen in FIG. 2, in one embodiment, secure secrets proxy creation template 200 includes secure secrets proxy secrets application request data receipt logic 213 for, as discussed below, receiving secrets application request data from a second virtual asset instantiated in the first computing environment, the second virtual asset requiring the application of one or more secrets to second virtual asset data provided through the second virtual asset, the secrets application request data representing a request that one or more secrets be applied to the second virtual asset data.

As seen in FIG. 2, in one embodiment, secure secrets proxy creation template 200 includes secure secrets proxy cached secrets retrieval logic 215 for retrieving the secrets associated with the secrets application request data from the secure secrets cache.

As seen in FIG. 2, in one embodiment, secure secrets proxy creation template 200 includes secure secrets proxy secrets application logic 217 for, as discussed below, coordinating the application of the secrets associated with the secrets application request data to the second virtual asset data.

In one embodiment, a secrets distribution management system is provided in a second computing environment that, in one embodiment, is distinct from the first computing environment in which the secure secrets proxy is instantiated.

In one embodiment, the secrets distribution management system has access to secrets data representing one or more secrets and controls the distribution of the one or more secrets in accordance with one or more secrets distribution policies. In accordance with one embodiment, the secrets data representing one or more secrets is obtained, and/or accessed through, the secrets distribution management system.

As used herein, the term "secrets" includes any information, credentials, or other devices, necessary to access one or more resources and/or computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to control access to various systems, resources, file systems and any other persistent storage, and data, and that are required for such access, as discussed herein, and/or as known/available in the art at the time of filing, and/or as developed/made available after the time of filing.

In one embodiment, the secrets represented by the secrets data are of one or more types, or classifications, of secrets. In various embodiments, the secrets are classified according to the type of resource the secret is used to access. For example, usernames, passwords, and passphrases, necessary to access various applications would be classified as user account access secrets, while digital certificates associated with Secure Socket Layer (SSL) communications channels would be classified as communication secrets, and encryption keys would be classified as encryption secrets. In addition, the secrets represented by the secrets data can be classified according to whether the secrets provide access to internal resources, such as databases and data in a data center, or access to external resources such as services offered through a cloud or the Internet.

In one embodiment, the different classes of secrets are provided by, and/or originate from, different secret sources. In one embodiment, the secrets data representing the different classes of secrets are maintained in separate secret databases or data stores. In one embodiment, the secrets data is provided to the secrets distribution management system, and/or maintained by, and/or on behalf of, a data/resources services center, such as a data center, providing data and/or resources to distributed computing systems, such as cloud-based computing environments and resources. Consequently, in one embodiment, the secrets controlled and/or accessed by the secrets distribution management system includes data representing one or more classes of secrets used to control access to one or more types of resources associated with the classes of secrets by one or more entities, such as a requesting virtual asset, residing physically or logically outside the data/resources services center where the secrets data is maintained, and/or accessed.

In FIG. 1 the secrets data is represented by secrets data 100A, cache secrets data 100C, secrets data 100N included in secrets database 100; secrets data 101A, cache secrets data 101C, secrets data 101N, included in secrets database 101; and secrets data 102A, secrets data 102B, secrets data 102N, included in secrets database 102. In one embodiment, each of secrets databases 100, 101, and 102 is a source of a different class of secrets that is part of, or accessible by, secrets distribution management system 110 in second computing environment 12.

As shown in FIG. 1, the secrets represented in the secrets data are used to access various resources such as resource 170. In various embodiments, resource 170 can reside at a location outside of second computing environment 12 and first computing environment 11 or within first computing environment 11 or second computing environment 12. In FIG. 1 three secrets databases, 100, 101, and 102 are illustratively shown. However, in various embodiments, any number of secrets databases are utilized and/or accessed.

Given the nature of the secrets represented by the secrets data, it is fundamental that the secrets data be kept secure and only be released to entities, such as virtual assets, that are authenticated and legitimately qualified to receive secrets, and the specific classes of secrets. To this end, the secrets distribution management system controls the distribution of the secrets data in accordance with one or more secrets distribution polices and one or more secrets distribution factors used to control the distribution of the one or more secrets, and classes of secrets.

As discussed below, in one embodiment, each virtual asset in a computing environment is assigned a given role. In one embodiment, as part of the secrets distribution policy, the secrets that can be provided to each role are defined. In one embodiment, these roles are defined in secrets meta-data.

In one embodiment, each virtual asset is assigned a single role. However, many virtual assets can be assigned, and perform, the same role.

In other embodiments, a given virtual asset can play multiple roles, for example, a Web Instance can have a role called "web-instance" and same instance can have the role of "cache-server".

In one embodiment, the secrets distribution factors include one or more checks or tests to be performed on virtual assets requesting secrets data that allow for a determination as to what secrets the requesting virtual asset legitimately needs.

In various embodiments, the secrets distribution policy data is open-endedly defined such that the secrets distribution policy, and/or secrets distribution factors, can be defined by the one or more parties associated with the distribution of the secrets, such as, but not limited to, the owner of a data center keeping or accessing the secrets data, the owner or provider of a cloud computing environment, the owner or a provider of a service, the owner or provider of one or more resources accessible using the secrets data, and/or any other party legitimately authorized to control the distribution of secrets. In this way, using the disclosed process for providing a secure secrets proxy, the secrets distribution policy can be tailored to the specific needs of the one or more parties associated with the distribution of the secrets. In addition, the secrets distribution policies, and/or secrets distribution factors, can be added, modified, or deleted, as needed to meet the needs of the one or more parties associated with the distribution of secrets.

In one embodiment, the secure secrets proxy authentication data is provided to the secrets distribution management system by the secure secrets proxy.

As noted above, the secure secrets proxy authentication data includes one or more additional, or alternative, challenges, and/or responses to challenges, that are used to authenticate the secure secrets proxy and to further identify the secure secrets proxy to the secrets distribution management system as a trusted agent eligible to receive, and/or cache, one or more secrets in the first computing environment.

As also noted above, in one embodiment, the secure secrets proxy authentication data is used or provided to the secrets distribution management system as part of the bootstrap handshake with the secrets distribution management system at the time the secure secrets proxy is first instantiated in the first computing environment. In one embodiment, the secure secrets proxy authentication data is provided in addition to standard authentication procedures performed with an initial set of credentials.

As noted above, in one embodiment the one or more additional or alternative challenges included in the secure secrets proxy authentication data includes automatically loading specified datum from a specified storage service onto the secure secrets proxy and then providing the specified datum to the secrets distribution management system to confirm the identity of the secure secrets proxy as a trusted virtual asset eligible to receive and/or cache secrets.

As also noted above, in one embodiment, the one or more additional or alternative challenges included in the secure secrets proxy authentication data includes data for reading or obtaining hardware identification data indicating the identification of the underlying hardware on which the secure secrets proxy virtual machine is running. In one embodiment, the hardware identification data is then confirmed by comparing it with data obtained via other systems, such as a cloud provider control plane. In one embodiment, this confirmation data is then provided to the secrets distribution management system as part of the secure secrets proxy authentication data.

Referring back to FIG. 1, secure secrets proxy authentication data, represented by proxy authentication data 121 is provided to secrets distribution management system 110 in second computing environment 12 by secure secrets proxy 120 in first computing environment 11 via communications channel 180.

In one embodiment, in response to the secure secrets proxy authentication data, the secrets distribution management system authenticates the secure secrets proxy and confirms the identification of the secure secrets proxy as a trusted virtual asset in the first computing environment for receiving and/or caching secrets controlled by the secrets distribution management system.

In one embodiment, the secure secrets proxy generates cache secrets request data representing a request for data representing one or more requested secrets controlled by the secrets distribution management system to be cached by the secure secrets proxy in a secure secrets cache outside the second computing system environment of the secrets distribution management system.

As a specific example, in one embodiment the secure secrets proxy is a virtual machine instance in a cloud computing environment that generates cache secrets request data representing a request for data representing one or more requested secrets controlled by the secrets distribution management system in a data center to be cached by the secure secrets proxy within the cloud computing environment, or in a data store outside the data center and/or the cloud computing environment.

In one embodiment, the one or more requested secrets to be cached in the secure secrets cache are selected by the secure secrets proxy based, at least in part, on an environmental analysis performed by the secure secrets proxy.

In one embodiment, the one or more requested secrets to be cached in the secure secrets cache are selected by the secure secrets proxy based, at least in part, on the type of computing environment represented by the first computing environment.

In one embodiment, the one or more requested secrets to be cached in the secure secrets cache are selected by the secure secrets proxy based, at least in part, on the types of other virtual assets in the first computing environment.

In one embodiment, the one or more requested secrets to be cached in the secure secrets cache are selected by the secure secrets proxy based, at least in part, on the capabilities of other virtual assets in the first computing environment.

In one embodiment, the one or more requested secrets to be cached in the secure secrets cache are selected by the secure secrets proxy based, at least in part, on reputation profiles of the virtual assets in the first computing environment.

In one embodiment, the one or more requested secrets to be cached in the secure secrets cache are selected by the secure secrets proxy based, at least in part, on the resources associated with other virtual assets in the first computing environment.

In one embodiment, the one or more requested secrets to be cached in the secure secrets cache are selected by the secure secrets proxy based, at least in part, on the role, or roles, assigned to the other virtual assets in the first computing environment.

In one embodiment, the cache secrets request data is provided to the secrets distribution management system by the secure secrets proxy. In one embodiment, the cache secrets request data is provided to the secrets distribution management system via a secure communications channel, such as an authenticated Secure Sockets Layer (SSL) communication channel, and/or any other private communications channel.

Referring to FIG. 1, using environmental analysis data 125 secure secrets proxy 120 generates cache secrets request data 123 which is, in turn, provided to secrets distribution management system 110 in second computing environment 12 by secure secrets proxy 120 in first computing environment 11 via communications channel 180.

In one embodiment, in response to the cache secrets request data, and in light of the secure secrets proxy authentication and identification as a trusted virtual asset, the secrets distribution management system provides data representing the one or more requested secrets of the cache secrets request data to the control of the secure secrets proxy and/or the secure secrets cache.

In various embodiments, the secure secrets cache is a secrets data store located outside the second computing environment of the secrets distribution management system. In one embodiment the secrets data store is also located outside the first computing environment of the secure secrets proxy. In these embodiments, the secure secrets proxy is provided access to the one or more secrets cached in the secrets data store so that the secure secrets proxy can access and/or transfer data representing the one or more secrets as needed.

In other embodiments, the secure secrets cache is a cache within the secure secrets proxy. Consequently, in these embodiments, the data representing the one or more secrets is maintained in the secure secrets proxy.

Referring to FIG. 1, data representing the one or more requested secrets of cache secrets request data 123, represented in FIG. 1 as cache secrets data 100C and cache secrets data 101C, is provided to secrets cache 134 of secure secrets proxy 120 or, in the alternative, secrets data store 160 where it is accessed by secure secrets proxy 120 via communications channel 185 as needed.

In one embodiment, once the one or more secrets represented in the secure secrets data requested via the cache secrets request data is received from the secrets distribution management system at the secure secrets cache, a second virtual asset instantiated in the first computing environment of the secure secrets proxy generates secrets application request data requesting that one or more secrets be applied to second virtual asset data generated by, and/or through, and/or otherwise associated with, the second virtual asset.

As used herein, the term "virtual asset" includes any virtualized entity or resource, and/or actual, or "bare metal" entity requiring access to various resources, and types of resources. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "hard metal" physical devices such as mobile devices, remote sensors, laptops, desktops, point-of-sale devices, ATMs, electronic voting machines, etc. requiring access to various resources, and/or types of resources, located within a data center, within a cloud computing environment, and/or any other physical or logical location, as discussed herein, and/or as known/available in the art at the time of filing, and/or as developed/made available after the time of filing.

In one embodiment, the secrets application request data from the second virtual asset is received by the secure secrets proxy.

In one embodiment, the secure secrets proxy is also provided the second virtual asset data and, in one embodiment, data indicating instructions for storing the second virtual asset data once the requested secrets have been applied to the second virtual asset data.

Referring to FIG. 1, second virtual asset 140 instantiated in first computing environment 11 of secure secrets proxy 120 includes second virtual asset data, represented by second asset data/object 144 in FIG. 1, and generates secrets application request data 145 requesting that one or more secrets be applied to second virtual asset data. As also seen in FIG. 1, secrets application request data 145 is provided to secure secrets proxy 120.

In one embodiment, in response to the secrets application request data from the second virtual asset, the secure secrets proxy proceeds to authenticate the second virtual asset and to determine if secrets application request data is appropriate for the second virtual asset.

In one embodiment, the secure secrets proxy authenticates the second virtual asset and determines if the secrets application request data is appropriate using the one or more secrets distribution factors included in the secrets distribution policy.

As noted above, the secrets distribution factors include one or more checks or tests to be performed on virtual assets that allow for a determination as to the nature of the virtual asset and what secrets and processes are legitimately associated with that virtual asset.

As discussed above, in one embodiment, each virtual asset in a computing environment is assigned a given role. In one embodiment, as part of the secrets distribution policy, the secrets that can be provided to each role are defined. In one embodiment, these roles are defined in secrets meta-data.

In light of this fact, in one embodiment, the secure secrets proxy authenticates the second virtual asset and determines if secrets application request data is appropriate for the second virtual asset based on the role, or roles, assigned to the second virtual asset.

Referring to FIG. 1, second virtual asset 140 includes virtual asset authentication data 143 which is provided to secure secrets proxy 120 for authentication and analysis using the one or more secrets distribution factors included in the secrets distribution policy.

In one embodiment, once the second virtual asset is authenticated and it is determined that the secrets application request data is appropriate for the second virtual asset, the secure secrets proxy determines what secrets are required to comply with the secrets application request data and then the determined required secrets are obtained from the secure secrets cache.

In one embodiment, once the secure secrets proxy obtains the required secrets from the secure secrets cache, the secure secrets proxy proceeds to coordinate the application of the secrets associated with the secrets application request data on, or to, the second virtual asset data.

In one embodiment, once the required secrets are applied to the second virtual asset data, the second virtual asset data is stored in accordance with any directions received from the second virtual asset.

As a specific illustrative example of one embodiment of the application of the process for providing a secure secrets proxy, a secure secrets proxy is instantiated in a cloud computing environment and authenticates itself to a secrets distribution management system located in a data center. In one embodiment, as part of the bootstrap handshake with the secrets distribution management system, the secure secrets proxy provides the secrets distribution management system the secure secrets proxy authentication data identifying the secure secrets proxy as a trusted virtual asset in the cloud.

In one embodiment, based on the cloud environment in which the secure secrets proxy resides, the secure secrets proxy requests one or more encryption keys in cache secrets request data transmitted to the secrets distribution management system via an authenticated SSL communication channel. In this specific illustrative example, based on the secure secrets proxy authentication data and the identity of the secure secrets proxy as a trusted virtual asset in the cloud, the secrets distribution management system provides the secure secrets proxy the requested encryption keys via the authenticated SSL communication channel.

In this specific illustrative example, the requested encryption keys are then cached in the secure secrets proxy. In one embodiment, a second virtual asset in the cloud environment of the secure secrets proxy provides an encryption application request that requests that an object, assume in this specific illustrative example an image, generated by the second virtual asset be encrypted and stored in a designated cloud storage location.

In this specific illustrative example, the secure secrets proxy validates the second virtual asset and confirms that the second virtual asset is eligible to request encryption of the image data. In this specific illustrative example, once the second virtual asset is validated, the secure secrets proxy determines the required encryption keys and obtains the required encryption keys from the secure secrets cache in the secure secrets proxy.

In this specific illustrative example, the secure secrets proxy also obtains the image data. In this specific illustrative example, the secure secrets proxy then transmits the image data and the required encryption keys to an encryption engine located either in the cloud, outside the cloud, and/or in the second virtual asset itself. In this specific illustrative example, the secure secrets proxy then directs the encryption engine to perform object level encryption of the image data.

In this specific illustrative example, the secure secrets proxy then coordinates the storage of the object level encrypted image in the designated cloud storage location, e.g., in an object store.

Using the process for providing a secure secrets proxy discussed above, management of secrets data, and the application of secrets data, becomes a highly automated process performed under the orchestration of a secure secrets proxy that is instantiated in the computing environment where the data to which secrets are to be applied is generated. In addition, the secure secrets proxy discussed herein acts as both a local cache for secrets data, thereby minimizing latencies associated with obtaining secure secrets, and a trusted intermediary between the computing environment where the secrets are to be applied and the computing environment of a secrets distribution management system, and/or where the secrets are stored. Consequently, the process for providing a secure secrets proxy discussed herein provides for the management of secrets data, and the application of the secrets data, in a highly automated manner that minimizes latencies and can operate in multiple environments, without compromising the secrets, the resources accessed using the secrets, and/or any data or objects associated with the secrets.

In various embodiments, the secure secrets proxy is an encryption proxy used to manage and apply encryption keys in the computing environment where the encryption proxy is instantiated.

In accordance with one embodiment, an encryption proxy is provided in a first computing environment.

In one embodiment, the encryption proxy is a virtual asset instantiated in the first computing environment. In one embodiment, as a specific illustrative example, the encryption proxy is a virtual machine, or server instance, instantiated in a cloud computing environment.

In one embodiment, the encryption proxy is instantiated in the first computing environment using a virtual machine template through which the creator of the encryption proxy can generate operational logic, and assign resources and attributes to the encryption proxy. In one embodiment, the virtual machine template includes provided logic for generating and/or processing encryption proxy authentication data associated with the encryption proxy and identifying the encryption proxy as a trusted agent generated within the first computing environment.

In one embodiment, the encryption proxy authentication data includes one or more additional, or alternative, challenges, and/or responses to challenges, that are used to authenticate the encryption proxy and to further identify the encryption proxy as a trusted agent for receiving and/or caching one or more encryption keys. In one embodiment, the encryption proxy authentication data is used or provided to other entities as part of the bootstrap handshake with those entities at the time the encryption proxy is first instantiated in the first computing environment. As discussed below, in one embodiment the encryption proxy authentication data is provided to a secrets distribution management system in a second computing environment in order to authenticate the encryption proxy and identify the encryption proxy as a trusted asset in the first computing environment eligible to receive, and/or cache, one or more encryption keys. In one embodiment, the encryption proxy authentication data is provided in addition to standard authentication procedures performed with an initial set of credentials.

In one embodiment the one or more additional or alternative challenges included in the encryption proxy authentication data includes automatically loading specified datum from a specified storage service onto the encryption proxy and then providing the specified datum to an entity needing to confirm the identity of the encryption proxy as a trusted virtual asset eligible to receive and/or cache encryption keys.

In one embodiment, the one or more additional or alternative challenges included in the encryption proxy authentication data includes data for reading or obtaining hardware identification data indicating the identification of the underlying hardware on which the encryption proxy virtual machine is running. In one embodiment, the hardware identification data is then confirmed by comparing it with data obtained via other systems, such as a cloud provider control plane.

Figure 4:
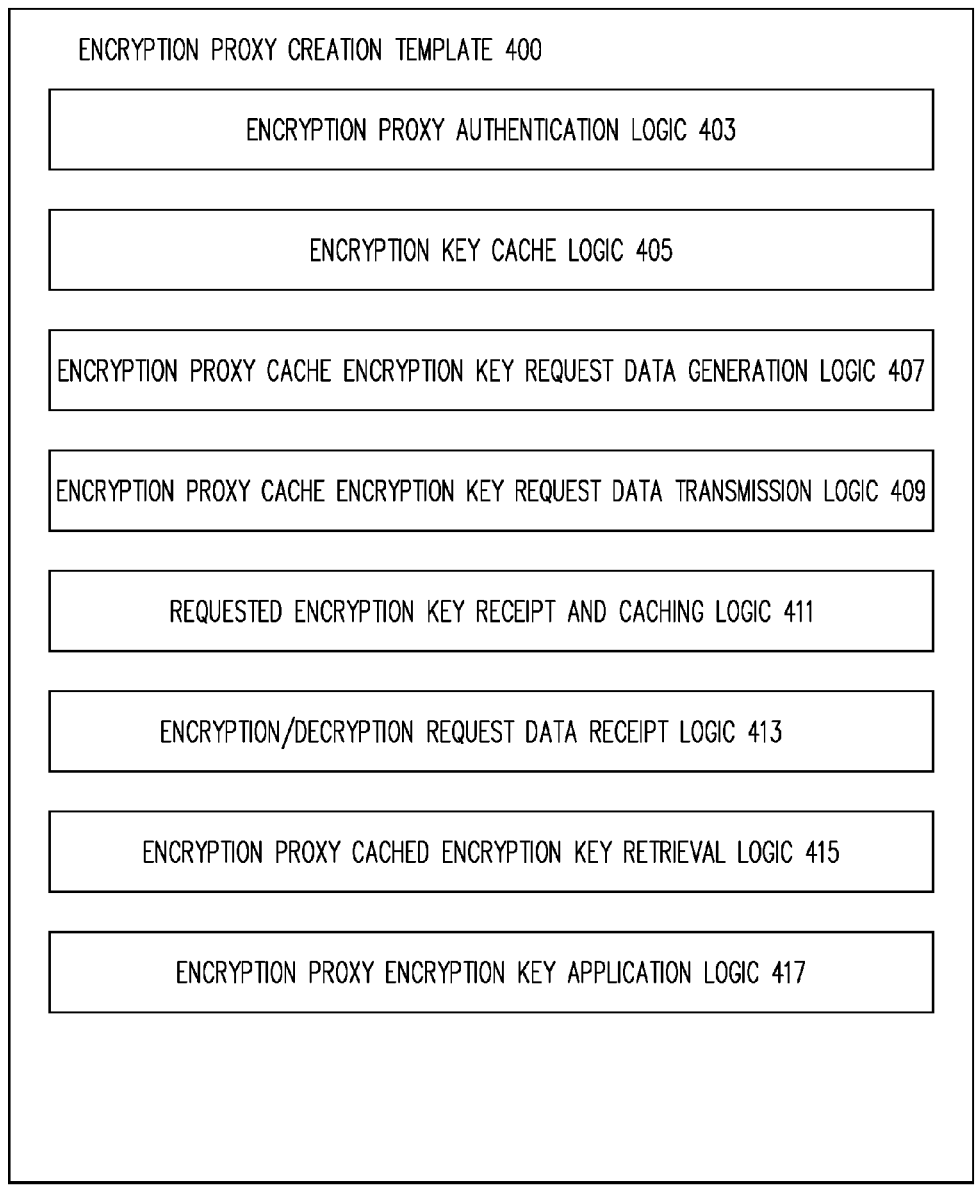
FIG. 4 is a functional diagram of an encryption proxy creation template in accordance with one embodiment.

FIG. 4 is a functional diagram of part of the operational logic of an encryption proxy creation template 400 for creating an encryption proxy in accordance with one embodiment.

As seen in FIG. 4, in one embodiment, encryption proxy creation template 400 includes encryption proxy authentication logic 403 for generating and/or processing encryption proxy authentication data associated with the encryption proxy and identifying the encryption proxy as a trusted agent generated within the first computing environment.

As seen in FIG. 4, in one embodiment, encryption proxy creation template 400 includes encryption key cache logic 405 to provide an encryption key cache or an encryption key data store where, as discussed below, one or more requested encryption keys can be stored in the first computing environment.

As seen in FIG. 4, in one embodiment, encryption proxy creation template 400 includes encryption proxy cache encryption key request data generation logic 407 for, as discussed below, generating cache encryption key request data representing a request for data representing one or more requested encryption keys to be cached in the encryption key cache.

As seen in FIG. 4, in one embodiment, encryption proxy creation template 400 includes encryption proxy cache encryption key request data transmission logic 409 for, as discussed below, providing the cache encryption key request data to a secrets distribution management system.

As seen in FIG. 4, in one embodiment, encryption proxy creation template 400 includes requested encryption key receipt and caching logic 411 for, as discussed below, receiving and storing data representing the one or more requested encryption keys to be cached in the secure secrets cache.

As seen in FIG. 4, in one embodiment, encryption proxy creation template 400 includes encryption/decryption request data receipt logic 413 for, as discussed below, receiving encryption/decryption request data from a second virtual asset instantiated in the first computing environment.

As seen in FIG. 4, in one embodiment, encryption proxy creation template 400 includes encryption proxy cached encryption key retrieval logic 415 for retrieving the encryption keys associated with the encryption/decryption request data from the encryption key cache.

As seen in FIG. 4, in one embodiment, encryption proxy creation template 400 includes encryption proxy encryption key application logic 417 for, as discussed below, coordinating the encryption/decryption of the second virtual asset data.

In one embodiment, a secrets distribution management system is provided in a second computing environment that, in one embodiment, is distinct from the first computing environment in which the encryption proxy is instantiated.

In one embodiment, the secrets distribution management system has access to encryption key data representing one or more encryption keys and controls the distribution of the one or more encryption keys in accordance with one or more encryption key distribution policies. In accordance with one embodiment, the encryption key data representing one or more encryption keys is obtained, and/or accessed through, the secrets distribution management system.

In one embodiment, the secrets distribution management system is Hardware Security Module (HSM).

Given the sensitive nature of the encryption keys represented by the encryption key data, it is fundamental that the encryption key data be kept secure and only be released to entities, such as virtual assets, that are authenticated and legitimately qualified to receive encryption keys, and specific authorized encryption keys. To this end, the secrets distribution management system controls the distribution of the encryption key data in accordance with one or more encryption key distribution polices and one or more encryption key distribution factors used to control the distribution of the one or more encryption keys.

In one embodiment, the encryption key distribution factors include one or more checks or tests to be performed on virtual assets requesting encryption key data that allow for a determination as to what encryption keys the requesting virtual asset legitimately needs.

In various embodiments, the encryption key distribution policy data is open-endedly defined such that the encryption key distribution policy, and/or encryption key distribution factors, can be defined by the one or more parties associated with the distribution of the secrets, such as, but not limited to, the owner of a data center keeping or accessing the encryption key data, the owner or provider of a cloud, the owner or a provider of a service, the owner or provider of one or more resources accessible using the encryption key data, and/or any other party legitimately authorized to control the distribution of secrets. In this way, using the disclosed process for providing an encryption proxy, the encryption key distribution policy can be tailored to the specific needs of the one or more parties associated with the distribution of the secrets. In addition, the secrets distribution policies, and/or encryption key distribution factors, can be added, modified, or deleted, as needed to meet the needs of the one or more parties associated with the distribution of secrets.

In one embodiment, the encryption proxy authentication data is provided to the secrets distribution management system by the encryption proxy.

As noted above, the encryption proxy authentication data includes one or more additional, or alternative, challenges, and/or responses to challenges, that are used to authenticate the encryption proxy and to further identify the encryption proxy to the secrets distribution management system as a trusted agent eligible to receive, and/or cache, one or more encryption keys in the first computing environment.

As also noted above, in one embodiment, the encryption proxy authentication data is used or provided to the secrets distribution management system as part of the bootstrap handshake with the secrets distribution management system at the time the encryption proxy is first instantiated in the first computing environment. In one embodiment, the encryption proxy authentication data is provided in addition to standard authentication procedures performed with an initial set of credentials.

In one embodiment, in response to the encryption proxy authentication data, the secrets distribution management system authenticates the encryption proxy and confirms the identification of the encryption proxy as a trusted virtual asset in the first computing environment for receiving and/or caching secrets controlled by the secrets distribution management system.

In one embodiment, the encryption proxy generates cache encryption key request data representing a request for data representing one or more requested encryption keys controlled by the secrets distribution management system to be cached in an encryption key cache outside the second computing system environment of the secrets distribution management system.

As a specific example, in one embodiment the encryption proxy is a virtual machine instance in a cloud computing environment which generates cache encryption key request data representing a request for data representing one or more requested encryption keys controlled by the secrets distribution management system in a data center to be cached by the encryption proxy within the cloud computing environment, or in a data store outside the data center and/or the cloud computing environment.

In one embodiment, the cache encryption key request data is provided to the secrets distribution management system by the encryption proxy. In one embodiment, the cache encryption key request data is provided to the secrets distribution management system via a secure communications channel, such as an authenticated Secure Sockets Layer (SSL) communication channel, and/or any other private communications channel.

In one embodiment, in response to the cache encryption key request data, and in light of the encryption proxy authentication and identification as a trusted virtual asset, the secrets distribution management system provides data representing the one or more requested encryption keys of the cache encryption key request data to the control of the encryption proxy and/or the encryption key cache.

In various embodiments, the encryption key cache is an encryption key data store located outside the second computing environment of the secrets distribution management system. In one embodiment the encryption key data store is also located outside the first computing environment of the encryption proxy. In these embodiments, the encryption proxy is provided access to the one or more encryption keys cached in the encryption key data store so that the encryption proxy can access and/or transfer data representing the one or more encryption keys as needed.

In other embodiments, the encryption key cache is a cache within the encryption proxy. Consequently, in these embodiments, the data representing the one or more encryption keys is maintained in the encryption proxy.

In one embodiment, once the one or more encryption keys represented in the secure encryption key data requested via the cache encryption key request data is received from the secrets distribution management system at the encryption key cache, a second virtual asset instantiated in the first computing environment of the encryption proxy generates encryption/decryption request data requesting the encryption or decryption of second virtual asset data generated by, and/or through, and/or otherwise associated with, the second virtual asset.

In one embodiment, the encryption/decryption request from the second virtual asset is received by the encryption proxy.

In one embodiment, the encryption proxy is also provided the second virtual asset data and, in one embodiment, data indicating instructions for storing the encrypted/decrypted second virtual asset data once the second virtual asset data has been encrypted or decrypted.

In one embodiment, in response to the encryption/decryption request from the second virtual asset, the encryption proxy proceeds to authenticate the second virtual asset and to determine if encryption/decryption request is appropriate for the second virtual asset.

In one embodiment, the encryption proxy authenticates the second virtual asset and determines if the encryption/decryption request is appropriate using the one or more encryption key distribution factors included in the encryption key distribution policy.

As noted above, the encryption key distribution factors include one or more checks or tests to be performed on virtual assets that allow for a determination as to the nature of the virtual asset and what secrets and processes are legitimately associated with that virtual asset.

As discussed above, in one embodiment, each virtual asset in a computing environment is assigned a given role. In one embodiment, as part of the encryption key distribution policy, the secrets that can be provided to each role are defined. In one embodiment, these roles are defined in secrets meta-data.

In light of this fact, in one embodiment, the encryption proxy authenticates the second virtual asset and determines if encryption/decryption request is appropriate for the second virtual asset based on the role, or roles, assigned to the second virtual asset.

In one embodiment, once the second virtual asset is authenticated and it is determined that the encryption/decryption request is appropriate for the second virtual asset, the encryption proxy determines what encryption keys are required to comply with the encryption/decryption request and then the determined required encryption keys are obtained from the encryption key cache.

In one embodiment, once the encryption proxy obtains the required encryption keys from the encryption key cache, the encryption proxy proceeds to coordinate the encryption or decryption of the second virtual asset data.

In one embodiment, the encryption proxy coordinates the encryption or decryption of the second virtual asset data performed by an encryption engine implemented in the first computing environment.

In one embodiment, the encryption proxy coordinates the encryption or decryption of the second virtual asset data performed by an encryption engine implemented outside the first computing environment.

In one embodiment, the encryption proxy coordinates the encryption or decryption of the second virtual asset data performed by an encryption engine implemented on the second virtual asset.

In one embodiment, the encryption proxy coordinates the encryption or decryption of the second virtual asset data performed by an encryption engine implemented in/on the encryption proxy.

In one embodiment, the encryption proxy coordinates the encryption or decryption of the second virtual asset data in accordance with defined encryption policy.

As a specific illustrative example, the length of the encryption keys requested and used is determined in accordance to the laws of a given country. As another example, the kind of encryption applied, e.g., symmetric or asymmetric, is determined in accordance with defined encryption policy.

In one embodiment, once the encryption or decryption of the second virtual asset data is complete, the encrypted or decrypted second virtual asset data is stored in accordance with any directions received from the second virtual asset.

In one embodiment, the second virtual asset data is an object and the encryption proxy coordinates object level encryption or decryption of the second virtual asset object. In one embodiment, once the encryption proxy coordinates object level encryption of the second virtual asset object, the encryption proxy coordinates the storing the object encrypted second virtual asset object in an object store.

Using the process for providing an encryption proxy discussed above, the management of encryption key data, and the encryption or decryption of data, becomes a highly automated process performed under the orchestration of an encryption proxy that is instantiated in the computing environment where the encryption or decryption takes place. In addition, the encryption proxy discussed herein acts as both a local cache for encryption key data, thereby minimizing latencies associated with obtaining encryption key data, and a trusted intermediary between the computing environment where the encryption or decryption is taking place and the computing environment of a secrets distribution management system, and/or where the encryption keys are stored. Consequently, the process for providing an encryption proxy discussed herein provides for the management of encryption key data, and the application of the encryption key data, in a highly automated manner that minimizes latencies and can operate in multiple environments, without compromising the encryption keys, the resources accessed using the encryption keys, and/or any data or objects encrypted or decrypted.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a method and system for providing a secure secrets proxy includes providing a secure secrets proxy in a first computing environment. In one embodiment, the secure secrets proxy is a virtual asset instantiated in the first computing environment. In one embodiment, the secure secrets proxy includes secure secrets proxy authentication data for identifying the secure secrets proxy as a trusted virtual asset in the first computing environment.

In one embodiment, a secrets distribution management system is provided in a second computing environment. In one embodiment, the secrets distribution management system has access to secrets data representing one or more secrets and controls the distribution of the one or more secrets in accordance with one or more secrets distribution policies. In one embodiment, the secure secrets proxy provides the secure secrets proxy authentication data to the secrets distribution management system and the secrets distribution management system authenticates the secure secrets proxy and identifies the secure secrets proxy as a trusted virtual asset eligible to cache secrets data in a secure secrets cache outside the second computing environment.

In one embodiment, based, in part, on the type of computing environment represented by the first computing environment, the secure secrets proxy generates cache secrets request data representing a request for data representing one or more requested secrets to be cached in the secure secrets cache. In one embodiment, the secure secrets proxy provides the cache secrets request data to the secrets distribution management system and, in response to the cache secrets request data, the secrets distribution management system provides data representing the one or more requested secrets to the secure secrets cache.

In one embodiment, a second virtual asset instantiated in the first computing environment generates secrets application request data requesting that one or more secrets be applied to second virtual asset data generated by, or through, or otherwise associated with, the second virtual asset. In one embodiment, the secure secrets proxy receives the secrets application request data and then the secure secrets proxy authenticates the second virtual asset. In one embodiment, the secure secrets proxy then obtains the secrets associated with the secrets application request data from the secure secrets cache and the secure secrets proxy coordinates the application of the secrets associated with the secrets application request data to the second virtual asset data.

Figure 3:
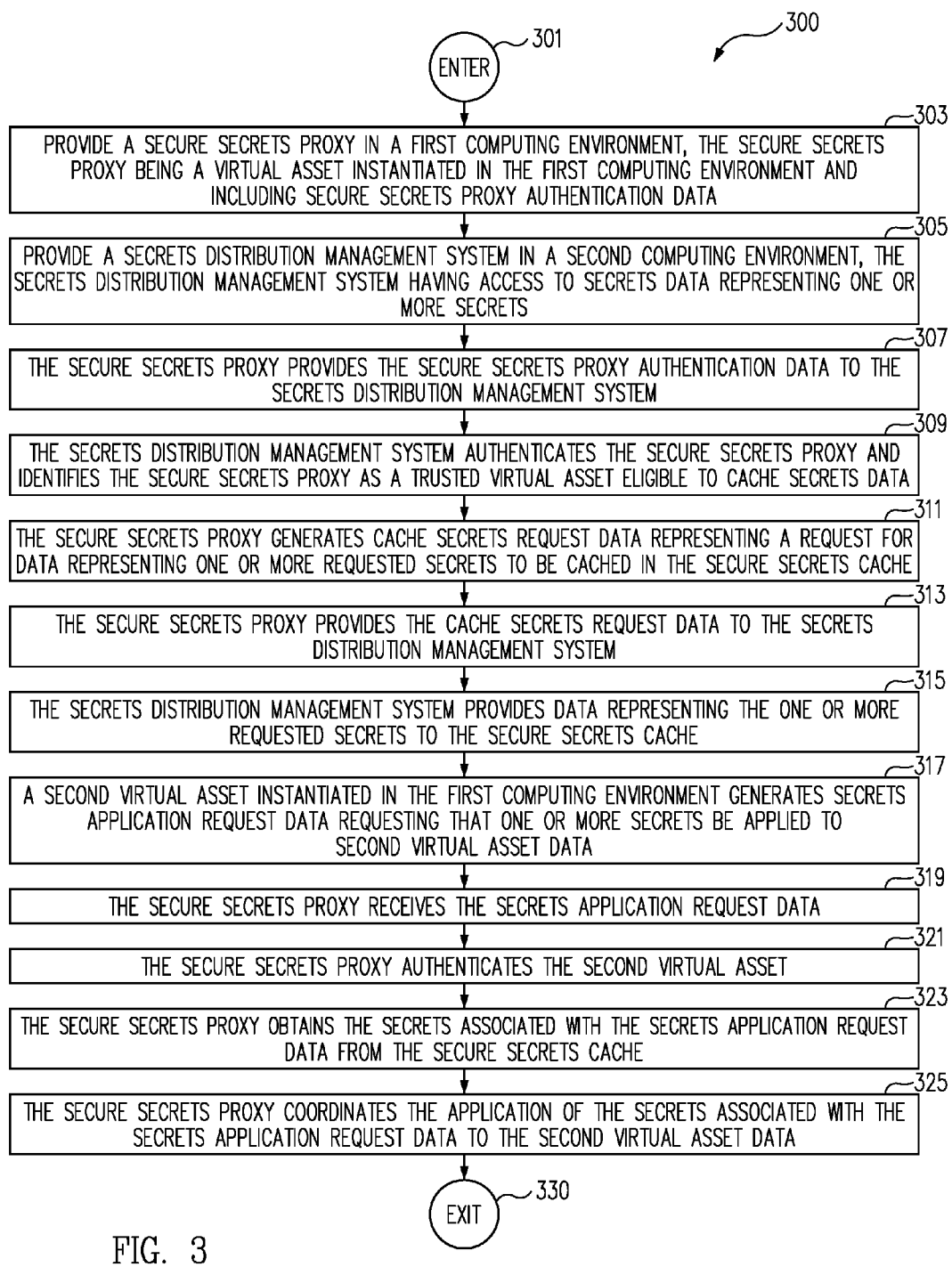
FIG. 3 is a flow chart depicting a process for providing a secure secrets proxy in accordance with one embodiment.

FIG. 3 is a flow chart of a process 300 for providing a secure secrets proxy in accordance with one embodiment. In one embodiment, process 300 for providing a secure secrets proxy begins at ENTER OPERATION 301 of FIG. 3 and process flow proceeds to PROVIDE A SECURE SECRETS PROXY IN A FIRST COMPUTING ENVIRONMENT, THE SECURE SECRETS PROXY BEING A VIRTUAL ASSET INSTANTIATED IN THE FIRST COMPUTING ENVIRONMENT AND INCLUDING SECURE SECRETS PROXY AUTHENTICATION DATA OPERATION 303.

In one embodiment, at PROVIDE A SECURE SECRETS PROXY IN A FIRST COMPUTING ENVIRONMENT, THE SECURE SECRETS PROXY BEING A VIRTUAL ASSET INSTANTIATED IN THE FIRST COMPUTING ENVIRONMENT AND INCLUDING SECURE SECRETS PROXY AUTHENTICATION DATA OPERATION 303 a secure secrets proxy is provided in a first computing environment.

In one embodiment, the secure secrets proxy of PROVIDE A SECURE SECRETS PROXY IN A FIRST COMPUTING ENVIRONMENT, THE SECURE SECRETS PROXY BEING A VIRTUAL ASSET INSTANTIATED IN THE FIRST COMPUTING ENVIRONMENT AND INCLUDING SECURE SECRETS PROXY AUTHENTICATION DATA OPERATION 303 is instantiated in the first computing environment.

In one embodiment, as a specific illustrative example, the secure secrets proxy of PROVIDE A SECURE SECRETS PROXY IN A FIRST COMPUTING ENVIRONMENT, THE SECURE SECRETS PROXY BEING A VIRTUAL ASSET INSTANTIATED IN THE FIRST COMPUTING ENVIRONMENT AND INCLUDING SECURE SECRETS PROXY AUTHENTICATION DATA OPERATION 303 is a virtual machine, or server instance, instantiated in a cloud computing environment.

In one embodiment, the secure secrets proxy of PROVIDE A SECURE SECRETS PROXY IN A FIRST COMPUTING ENVIRONMENT, THE SECURE SECRETS PROXY BEING A VIRTUAL ASSET INSTANTIATED IN THE FIRST COMPUTING ENVIRONMENT AND INCLUDING SECURE SECRETS PROXY AUTHENTICATION DATA OPERATION 303 is instantiated in the first computing environment using a virtual machine template through which the creator of the secure secrets proxy can assign resources and attributes to the secure secrets proxy. In one embodiment, the virtual machine template includes provided logic for generating and/or processing secure secrets proxy authentication data associated with the secure secrets proxy and identifying the secure secrets proxy as a trusted agent generated within the first computing environment.

In one embodiment, the secure secrets proxy authentication data includes one or more additional, or alternative, challenges, and/or responses to challenges, that are used to authenticate the secure secrets proxy and to further identify the secure secrets proxy as a trusted agent for receiving and/or caching one or more secrets. In one embodiment, the secure secrets proxy authentication data is used or provided to other entities as part of the bootstrap handshake with those entities at the time the secure secrets proxy is first instantiated in the first computing environment.

As discussed below, in one embodiment the secure secrets proxy authentication data is provided to a secrets distribution management system in a second computing environment in order to authenticate the secure secrets proxy and identify the secure secrets proxy as a trusted asset in the first computing environment eligible to receive, and/or cache, one or more secrets. In one embodiment, the secure secrets proxy authentication data is provided in addition to standard authentication procedures performed with an initial set of credentials.

In one embodiment, the one or more additional or alternative challenges included in the secure secrets proxy authentication data includes automatically loading specified datum from a specified storage service onto the secure secrets proxy and then providing the specified datum to an entity needing to confirm the identity of the secure secrets proxy as a trusted virtual asset eligible to receive and/or cache secrets.

In one embodiment, the one or more additional or alternative challenges included in the secure secrets proxy authentication data includes data for reading or obtaining hardware identification data indicating the identification of the underlying hardware on which the secure secrets proxy virtual machine is running. In one embodiment, the hardware identification data is then confirmed by comparing it with data obtained via other systems, such as a cloud provider control plane.

In one embodiment, once a secure secrets proxy is provided in a first computing environment at PROVIDE A SECURE SECRETS PROXY IN A FIRST COMPUTING ENVIRONMENT, THE SECURE SECRETS PROXY BEING A VIRTUAL ASSET INSTANTIATED IN THE FIRST COMPUTING ENVIRONMENT AND INCLUDING SECURE SECRETS PROXY AUTHENTICATION DATA OPERATION 303, process flow proceeds to PROVIDE A SECRETS DISTRIBUTION MANAGEMENT SYSTEM IN A SECOND COMPUTING ENVIRONMENT, THE SECRETS DISTRIBUTION MANAGEMENT SYSTEM HAVING ACCESS TO SECRETS DATA REPRESENTING ONE OR MORE SECRETS OPERATION 305.

In one embodiment, at PROVIDE A SECRETS DISTRIBUTION MANAGEMENT SYSTEM IN A SECOND COMPUTING ENVIRONMENT, THE SECRETS DISTRIBUTION MANAGEMENT SYSTEM HAVING ACCESS TO SECRETS DATA REPRESENTING ONE OR MORE SECRETS OPERATION 305 a secrets distribution management system is provided in a second computing environment that, in one embodiment, is distinct from the first computing environment in which the secure secrets proxy of PROVIDE A SECURE SECRETS PROXY IN A FIRST COMPUTING ENVIRONMENT, THE SECURE SECRETS PROXY BEING A VIRTUAL ASSET INSTANTIATED IN THE FIRST COMPUTING ENVIRONMENT AND INCLUDING SECURE SECRETS PROXY AUTHENTICATION DATA OPERATION 303 is instantiated.

In one embodiment, the secrets distribution management system of PROVIDE A SECRETS DISTRIBUTION MANAGEMENT SYSTEM IN A SECOND COMPUTING ENVIRONMENT, THE SECRETS DISTRIBUTION MANAGEMENT SYSTEM HAVING ACCESS TO SECRETS DATA REPRESENTING ONE OR MORE SECRETS OPERATION 305 has access to secrets data representing one or more secrets and controls the distribution of the one or more secrets in accordance with one or more secrets distribution policies. In accordance with one embodiment, the secrets data representing one or more secrets is obtained, and/or accessed through, the secrets distribution management system.

As used herein, the term "secrets" includes any information, credentials, or other devices, necessary to access one or more resources and/or computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to control access to various systems, resources, file systems and any other persistent storage, and data, and that are required for such access, as discussed herein, and/or as known/available in the art at the time of filing, and/or as developed/made available after the time of filing.

In one embodiment, the secrets represented by the secrets data are of one or more types, or classifications, of secrets. In various embodiments, the secrets are classified according to the type of resource the secret is used to access. For example, usernames, passwords, and passphrases, necessary to access various applications would be classified as user account access secrets, while digital certificates associated with Secure Socket Layer (SSL) communications channels would be classified as communication secrets, and encryption keys would be classified as encryption secrets. In addition, the secrets represented by the secrets data can be classified according to whether the secrets provide access to internal resources, such as databases and data in a data center, or access to external resources such as services offered through a cloud or the Internet.

In one embodiment, the different classes of secrets are provided by, and/or originate from, different secret sources. In one embodiment, the secrets data representing the different classes of secrets are maintained in separate secret databases or data stores. In one embodiment, the secrets data is provided to the secrets distribution management system, and/or maintained by, and/or on behalf of, a data/resources services center, such as a data center, providing data and/or resources to distributed computing systems, such as cloud-based computing environments and resources. Consequently, in one embodiment, the secrets controlled and/or accessed by the secrets distribution management system of PROVIDE A SECRETS DISTRIBUTION MANAGEMENT SYSTEM IN A SECOND COMPUTING ENVIRONMENT, THE SECRETS DISTRIBUTION MANAGEMENT SYSTEM HAVING ACCESS TO SECRETS DATA REPRESENTING ONE OR MORE SECRETS OPERATION 305 includes data representing one or more classes of secrets used to control access to one or more types of resources associated with the classes of secrets by one or more entities, such as a requesting virtual asset, residing physically or logically outside the data/resources services center where the secrets data is maintained, and/or accessed.

Given the nature of the secrets represented by the secrets data, it is fundamental that the secrets data be kept secure and only be released to entities, such as virtual assets, that are authenticated and legitimately qualified to receive secrets, and the specific classes of secrets. To this end, the secrets distribution management system of PROVIDE A SECRETS DISTRIBUTION MANAGEMENT SYSTEM IN A SECOND COMPUTING ENVIRONMENT, THE SECRETS DISTRIBUTION MANAGEMENT SYSTEM HAVING ACCESS TO SECRETS DATA REPRESENTING ONE OR MORE SECRETS OPERATION 305 controls the distribution of the secrets data in accordance with one or more secrets distribution polices and one or more secrets distribution factors used to control the distribution of the one or more secrets, and classes of secrets.

In one embodiment, the secrets distribution factors include one or more checks or tests to be performed on virtual assets requesting secrets data that allow for a determination as to what secrets the requesting virtual asset legitimately needs.

In various embodiments, the secrets distribution policy data is open-endedly defined such that the secrets distribution policy, and/or secrets distribution factors, can be defined by the one or more parties associated with the distribution of the secrets, such as, but not limited to, the owner of a data center keeping or accessing the secrets data, the owner or provider of a cloud, the owner or a provider of a service, the owner or provider of one or more resources accessible using the secrets data, and/or any other party legitimately authorized to control the distribution of secrets. In this way, using the disclosed process 300 for providing a secure secrets proxy, the secrets distribution policy can be tailored to the specific needs of the one or more parties associated with the distribution of the secrets. In addition, the secrets distribution policies, and/or secrets distribution factors, can be added, modified, or deleted, as needed to meet the needs of the one or more parties associated with the distribution of secrets.

In one embodiment, once a secrets distribution management system is provided in a second computing environment that, in one embodiment, is distinct from the first computing environment in which the secure secrets proxy is instantiated at PROVIDE A SECRETS DISTRIBUTION MANAGEMENT SYSTEM IN A SECOND COMPUTING ENVIRONMENT, THE SECRETS DISTRIBUTION MANAGEMENT SYSTEM HAVING ACCESS TO SECRETS DATA REPRESENTING ONE OR MORE SECRETS OPERATION 305, process flow proceeds to THE SECURE SECRETS PROXY PROVIDES THE SECURE SECRETS PROXY AUTHENTICATION DATA TO THE SECRETS DISTRIBUTION MANAGEMENT SYSTEM OPERATION 307.

In one embodiment, at THE SECURE SECRETS PROXY PROVIDES THE SECURE SECRETS PROXY AUTHENTICATION DATA TO THE SECRETS DISTRIBUTION MANAGEMENT SYSTEM OPERATION 307 the secure secrets proxy authentication data is provided to the secrets distribution management system of PROVIDE A SECRETS DISTRIBUTION MANAGEMENT SYSTEM IN A SECOND COMPUTING ENVIRONMENT, THE SECRETS DISTRIBUTION MANAGEMENT SYSTEM HAVING ACCESS TO SECRETS DATA REPRESENTING ONE OR MORE SECRETS OPERATION 305 by the secure secrets proxy of PROVIDE A SECURE SECRETS PROXY IN A FIRST COMPUTING ENVIRONMENT, THE SECURE SECRETS PROXY BEING A VIRTUAL ASSET INSTANTIATED IN THE FIRST COMPUTING ENVIRONMENT AND INCLUDING SECURE SECRETS PROXY AUTHENTICATION DATA OPERATION 303.

As noted above, the secure secrets proxy authentication data includes one or more additional, or alternative, challenges, and/or responses to challenges, that are used to authenticate the secure secrets proxy and to further identify the secure secrets proxy to the secrets distribution management system as a trusted agent eligible to receive, and/or cache, one or more secrets in the first computing environment.

As also noted above, in one embodiment, the secure secrets proxy authentication data is used or provided to the secrets distribution management system at THE SECURE SECRETS PROXY PROVIDES THE SECURE SECRETS PROXY AUTHENTICATION DATA TO THE SECRETS DISTRIBUTION MANAGEMENT SYSTEM OPERATION 307 as part of the bootstrap handshake with the secrets distribution management system at the time the secure secrets proxy is first instantiated in the first computing environment. In one embodiment, the secure secrets proxy authentication data is provided at THE SECURE SECRETS PROXY PROVIDES THE SECURE SECRETS PROXY AUTHENTICATION DATA TO THE SECRETS DISTRIBUTION MANAGEMENT SYSTEM OPERATION 307 in addition to standard authentication procedures performed with an initial set of credentials.

As noted above, in one embodiment the one or more additional or alternative challenges included in the secure secrets proxy authentication data includes automatically loading specified datum from a specified storage service onto the secure secrets proxy and then providing the specified datum to the secrets distribution management system to confirm the identity of the secure secrets proxy as a trusted virtual asset eligible to receive and/or cache secrets.

As also noted above, in one embodiment, the one or more additional or alternative challenges included in the secure secrets proxy authentication data includes data for reading or obtaining hardware identification data indicating the identification of the underlying hardware on which the secure secrets proxy virtual machine is running. In one embodiment, the hardware identification data is then confirmed by comparing it with data obtained via other systems, such as a cloud provider control plane. In one embodiment, this confirmation data is then provided to the secrets distribution management system.

In one embodiment, once the secure secrets proxy authentication data is provided to the secrets distribution management system by the secure secrets proxy at THE SECURE SECRETS PROXY PROVIDES THE SECURE SECRETS PROXY AUTHENTICATION DATA TO THE SECRETS DISTRIBUTION MANAGEMENT SYSTEM OPERATION 307, process flow proceeds to THE SECRETS DISTRIBUTION MANAGEMENT SYSTEM AUTHENTICATES THE SECURE SECRETS PROXY AND IDENTIFIES THE SECURE SECRETS PROXY AS A TRUSTED VIRTUAL ASSET ELIGIBLE TO CACHE SECRETS DATA OPERATION 309.

In one embodiment, at THE SECRETS DISTRIBUTION MANAGEMENT SYSTEM AUTHENTICATES THE SECURE SECRETS PROXY AND IDENTIFIES THE SECURE SECRETS PROXY AS A TRUSTED VIRTUAL ASSET ELIGIBLE TO CACHE SECRETS DATA OPERATION 309 in response to the secure secrets proxy authentication data of THE SECURE SECRETS PROXY PROVIDES THE SECURE SECRETS PROXY AUTHENTICATION DATA TO THE SECRETS DISTRIBUTION MANAGEMENT SYSTEM OPERATION 307, the secrets distribution management system authenticates the secure secrets proxy and confirms the identification of the secure secrets proxy as a trusted virtual asset in the first computing environment for receiving and/or caching secrets controlled by the secrets distribution management system.

In one embodiment, once the secrets distribution management system authenticates the secure secrets proxy and confirms the identification of the secure secrets proxy as a trusted virtual asset in the first computing environment for receiving and/or caching secrets controlled by the secrets distribution management system at THE SECRETS DISTRIBUTION MANAGEMENT SYSTEM AUTHENTICATES THE SECURE SECRETS PROXY AND IDENTIFIES THE SECURE SECRETS PROXY AS A TRUSTED VIRTUAL ASSET ELIGIBLE TO CACHE SECRETS DATA OPERATION 309, process flow proceeds to THE SECURE SECRETS PROXY GENERATES CACHE SECRETS REQUEST DATA REPRESENTING A REQUEST FOR DATA REPRESENTING ONE OR MORE REQUESTED SECRETS TO BE CACHED IN THE SECURE SECRETS CACHE OPERATION 311.

In one embodiment, at THE SECURE SECRETS PROXY GENERATES CACHE SECRETS REQUEST DATA REPRESENTING A REQUEST FOR DATA REPRESENTING ONE OR MORE REQUESTED SECRETS TO BE CACHED IN THE SECURE SECRETS CACHE OPERATION 311 the secure secrets proxy generates cache secrets request data representing a request for data representing one or more requested secrets controlled by the secrets distribution management system of PROVIDE A SECRETS DISTRIBUTION MANAGEMENT SYSTEM IN A SECOND COMPUTING ENVIRONMENT, THE SECRETS DISTRIBUTION MANAGEMENT SYSTEM HAVING ACCESS TO SECRETS DATA REPRESENTING ONE OR MORE SECRETS OPERATION 305 to be cached by the secure secrets proxy in a secure secrets cache outside the second computing system environment of the secrets distribution management system.

As a specific example, in one embodiment the secure secrets proxy is a virtual machine instance in a cloud computing environment that generates cache secrets request data representing a request for data representing one or more requested secrets controlled by the secrets distribution management system in a data center to be cached by the secure secrets proxy within the cloud computing environment, or in a data store outside the data center and/or the cloud computing environment.

In one embodiment, the one or more requested secrets to be cached in the secure secrets cache of THE SECURE SECRETS PROXY GENERATES CACHE SECRETS REQUEST DATA REPRESENTING A REQUEST FOR DATA REPRESENTING ONE OR MORE REQUESTED SECRETS TO BE CACHED IN THE SECURE SECRETS CACHE OPERATION 311 are selected by the secure secrets proxy based, at least in part, on the type of computing environment represented by the first computing environment.

In one embodiment, the one or more requested secrets to be cached in the secure secrets cache of THE SECURE SECRETS PROXY GENERATES CACHE SECRETS REQUEST DATA REPRESENTING A REQUEST FOR DATA REPRESENTING ONE OR MORE REQUESTED SECRETS TO BE CACHED IN THE SECURE SECRETS CACHE OPERATION 311 are selected by the secure secrets proxy based, at least in part, on the types of other virtual assets in the first computing environment.

In one embodiment, the one or more requested secrets to be cached in the secure secrets cache of THE SECURE SECRETS PROXY GENERATES CACHE SECRETS REQUEST DATA REPRESENTING A REQUEST FOR DATA REPRESENTING ONE OR MORE REQUESTED SECRETS TO BE CACHED IN THE SECURE SECRETS CACHE OPERATION 311 are selected by the secure secrets proxy based, at least in part, on the capabilities of other virtual assets in the first computing environment.

In one embodiment, the one or more requested secrets to be cached in the secure secrets cache of THE SECURE SECRETS PROXY GENERATES CACHE SECRETS REQUEST DATA REPRESENTING A REQUEST FOR DATA REPRESENTING ONE OR MORE REQUESTED SECRETS TO BE CACHED IN THE SECURE SECRETS CACHE OPERATION 311 are selected by the secure secrets proxy based, at least in part, on reputation profiles of the virtual assets in the first computing environment.

In one embodiment, the one or more requested secrets to be cached in the secure secrets cache of THE SECURE SECRETS PROXY GENERATES CACHE SECRETS REQUEST DATA REPRESENTING A REQUEST FOR DATA REPRESENTING ONE OR MORE REQUESTED SECRETS TO BE CACHED IN THE SECURE SECRETS CACHE OPERATION 311 are selected by the secure secrets proxy based, at least in part, on the resources associated with other virtual assets in the first computing environment.

In one embodiment, the one or more requested secrets to be cached in the secure secrets cache of THE SECURE SECRETS PROXY GENERATES CACHE SECRETS REQUEST DATA REPRESENTING A REQUEST FOR DATA REPRESENTING ONE OR MORE REQUESTED SECRETS TO BE CACHED IN THE SECURE SECRETS CACHE OPERATION 311 are selected by the secure secrets proxy based, at least in part, on the role, or roles, assigned to the other virtual assets in the first computing environment.

In one embodiment, once the secure secrets proxy generates cache secrets request data representing a request for data representing one or more requested secrets controlled by the secrets distribution management system to be cached by the secure secrets proxy in a secure secrets cache outside the second computing system environment of the secrets distribution management system at THE SECURE SECRETS PROXY GENERATES CACHE SECRETS REQUEST DATA REPRESENTING A REQUEST FOR DATA REPRESENTING ONE OR MORE REQUESTED SECRETS TO BE CACHED IN THE SECURE SECRETS CACHE OPERATION 311, process flow proceeds to THE SECURE SECRETS PROXY PROVIDES THE CACHE SECRETS REQUEST DATA TO THE SECRETS DISTRIBUTION MANAGEMENT SYSTEM OPERATION 313.

In one embodiment, at THE SECURE SECRETS PROXY PROVIDES THE CACHE SECRETS REQUEST DATA TO THE SECRETS DISTRIBUTION MANAGEMENT SYSTEM OPERATION 313 the cache secrets request data of THE SECURE SECRETS PROXY GENERATES CACHE SECRETS REQUEST DATA REPRESENTING A REQUEST FOR DATA REPRESENTING ONE OR MORE REQUESTED SECRETS TO BE CACHED IN THE SECURE SECRETS CACHE OPERATION 311 is provided to the secrets distribution management system by the secure secrets proxy.

In one embodiment, at THE SECURE SECRETS PROXY PROVIDES THE CACHE SECRETS REQUEST DATA TO THE SECRETS DISTRIBUTION MANAGEMENT SYSTEM OPERATION 313 the cache secrets request data is provided to the secrets distribution management system via a secure communications channel, such as an authenticated Secure Sockets Layer (SSL) communication channel, and/or any other private communications channel.

In one embodiment, once the cache secrets request data of THE SECURE SECRETS PROXY GENERATES CACHE SECRETS REQUEST DATA REPRESENTING A REQUEST FOR DATA REPRESENTING ONE OR MORE REQUESTED SECRETS TO BE CACHED IN THE SECURE SECRETS CACHE OPERATION 311 is provided to the secrets distribution management system by the secure secrets proxy at THE SECURE SECRETS PROXY PROVIDES THE CACHE SECRETS REQUEST DATA TO THE SECRETS DISTRIBUTION MANAGEMENT SYSTEM OPERATION 313, process flow proceeds to THE SECRETS DISTRIBUTION MANAGEMENT SYSTEM PROVIDES DATA REPRESENTING THE ONE OR MORE REQUESTED SECRETS TO THE SECURE SECRETS CACHE OPERATION 315.

In one embodiment, at THE SECRETS DISTRIBUTION MANAGEMENT SYSTEM PROVIDES DATA REPRESENTING THE ONE OR MORE REQUESTED SECRETS TO THE SECURE SECRETS CACHE OPERATION 315, in response to the cache secrets request data of THE SECURE SECRETS PROXY PROVIDES THE CACHE SECRETS REQUEST DATA TO THE SECRETS DISTRIBUTION MANAGEMENT SYSTEM OPERATION 313, and in light of the secure secrets proxy authentication and identification as a trusted virtual asset at THE SECRETS DISTRIBUTION MANAGEMENT SYSTEM AUTHENTICATES THE SECURE SECRETS PROXY AND IDENTIFIES THE SECURE SECRETS PROXY AS A TRUSTED VIRTUAL ASSET ELIGIBLE TO CACHE SECRETS DATA OPERATION 309, the secrets distribution management system provides data representing the one or more requested secrets of the cache secrets request data to the control of the secure secrets proxy and/or the secure secrets cache.

In various embodiments, the secure secrets cache of THE SECRETS DISTRIBUTION MANAGEMENT SYSTEM PROVIDES DATA REPRESENTING THE ONE OR MORE REQUESTED SECRETS TO THE SECURE SECRETS CACHE OPERATION 315 is a secrets data store located outside the second computing environment of the secrets distribution management system. In one embodiment the secrets data store of THE SECRETS DISTRIBUTION MANAGEMENT SYSTEM PROVIDES DATA REPRESENTING THE ONE OR MORE REQUESTED SECRETS TO THE SECURE SECRETS CACHE OPERATION 315 is also located outside the first computing environment of the secure secrets proxy. In these embodiments, the secure secrets proxy is provided access to the one or more secrets cached in the secrets data store so that the secure secrets proxy can access and/or transfer data representing the one or more secrets as needed.

In other embodiments, the secure secrets cache of THE SECRETS DISTRIBUTION MANAGEMENT SYSTEM PROVIDES DATA REPRESENTING THE ONE OR MORE REQUESTED SECRETS TO THE SECURE SECRETS CACHE OPERATION 315 is a cache within the secure secrets proxy. Consequently, in these embodiments, the data representing the one or more secrets is maintained in the secure secrets proxy.

In one embodiment, once the secrets distribution management system provides data representing the one or more requested secrets of the cache secrets request data to the control of the secure secrets proxy and/or the secure secrets cache at THE SECRETS DISTRIBUTION MANAGEMENT SYSTEM PROVIDES DATA REPRESENTING THE ONE OR MORE REQUESTED SECRETS TO THE SECURE SECRETS CACHE OPERATION 315, process flow proceeds A SECOND VIRTUAL ASSET INSTANTIATED IN THE FIRST COMPUTING ENVIRONMENT GENERATES SECRETS APPLICATION REQUEST DATA REQUESTING THAT ONE OR MORE SECRETS BE APPLIED TO SECOND VIRTUAL ASSET DATA OPERATION 317.

In one embodiment, at A SECOND VIRTUAL ASSET INSTANTIATED IN THE FIRST COMPUTING ENVIRONMENT GENERATES SECRETS APPLICATION REQUEST DATA REQUESTING THAT ONE OR MORE SECRETS BE APPLIED TO SECOND VIRTUAL ASSET DATA OPERATION 317 a second virtual asset instantiated in the first computing environment of the secure secrets proxy generates secrets application request data requesting that one or more secrets be applied to second virtual asset data generated by, and/or through, and/or otherwise associated with, the second virtual asset.

In one embodiment, once a second virtual asset instantiated in the first computing environment of the secure secrets proxy generates secrets application request data at A SECOND VIRTUAL ASSET INSTANTIATED IN THE FIRST COMPUTING ENVIRONMENT GENERATES SECRETS APPLICATION REQUEST DATA REQUESTING THAT ONE OR MORE SECRETS BE APPLIED TO SECOND VIRTUAL ASSET DATA OPERATION 317, process flow proceeds to THE SECURE SECRETS PROXY RECEIVES THE SECRETS APPLICATION REQUEST DATA OPERATION 319.

In one embodiment, at THE SECURE SECRETS PROXY RECEIVES THE SECRETS APPLICATION REQUEST DATA OPERATION 319 the secrets application request data from the second virtual asset is received by the secure secrets proxy.

In one embodiment, at THE SECURE SECRETS PROXY RECEIVES THE SECRETS APPLICATION REQUEST DATA OPERATION 319 the secure secrets proxy is also provided the second virtual asset data and, in one embodiment, data indicating instructions for storing the second virtual asset data once the requested secrets have been applied to the second virtual asset data.

In one embodiment, once the secrets application request data from the second virtual asset is received by the secure secrets proxy at THE SECURE SECRETS PROXY RECEIVES THE SECRETS APPLICATION REQUEST DATA OPERATION 319, process flow proceeds to THE SECURE SECRETS PROXY AUTHENTICATES THE SECOND VIRTUAL ASSET OPERATION 321.

In one embodiment, at THE SECURE SECRETS PROXY AUTHENTICATES THE SECOND VIRTUAL ASSET OPERATION 321, in response to the secrets application request data from the second virtual asset of THE SECURE SECRETS PROXY RECEIVES THE SECRETS APPLICATION REQUEST DATA OPERATION 319, the secure secrets proxy proceeds to authenticate the second virtual asset and to determine if secrets application request data is appropriate for the second virtual asset.

In one embodiment, at THE SECURE SECRETS PROXY AUTHENTICATES THE SECOND VIRTUAL ASSET OPERATION 321 the secure secrets proxy authenticates the second virtual asset and determines if the secrets application request data is appropriate using the one or more secrets distribution factors included in the secrets distribution policy.

As noted above, the secrets distribution factors include one or more checks or tests to be performed on virtual assets that allow for a determination as to the nature of the virtual asset and what secrets and processes are legitimately associated with that virtual asset.

As discussed above, in one embodiment, each virtual asset in a computing environment is assigned a given role. In one embodiment, as part of the secrets distribution policy, the secrets that can be provided to each role are defined. In one embodiment, these roles are defined in secrets meta-data.

In one embodiment, each virtual asset is assigned a single role. However, many virtual assets can be assigned, and perform, the same role.

In other embodiments, a given virtual asset can play multiple roles, for example, a Web Instance can have a role called "web-instance" and same instance can have the role of "cache-server".

In light of this fact, in one embodiment, at THE SECURE SECRETS PROXY AUTHENTICATES THE SECOND VIRTUAL ASSET OPERATION 321 the secure secrets proxy authenticates the second virtual asset and determines if secrets application request data is appropriate for the second virtual asset based on the role, or roles, assigned to the second virtual asset.

In one embodiment, once the secure secrets proxy authenticates the second virtual asset and determines if secrets application request data is appropriate for the second virtual asset at THE SECURE SECRETS PROXY AUTHENTICATES THE SECOND VIRTUAL ASSET OPERATION 321, process flow proceeds to THE SECURE SECRETS PROXY OBTAINS THE SECRETS ASSOCIATED WITH THE SECRETS APPLICATION REQUEST DATA FROM THE SECURE SECRETS CACHE OPERATION 323.

In one embodiment, at THE SECURE SECRETS PROXY OBTAINS THE SECRETS ASSOCIATED WITH THE SECRETS APPLICATION REQUEST DATA FROM THE SECURE SECRETS CACHE OPERATION 323 the secure secrets proxy determines what secrets are required to comply with the secrets application request data of THE SECURE SECRETS PROXY RECEIVES THE SECRETS APPLICATION REQUEST DATA OPERATION 319 and then the determined required secrets are obtained from the secure secrets cache of THE SECRETS DISTRIBUTION MANAGEMENT SYSTEM PROVIDES DATA REPRESENTING THE ONE OR MORE REQUESTED SECRETS TO THE SECURE SECRETS CACHE OPERATION 315.

In one embodiment, once the secure secrets proxy determines what secrets are required to comply with the secrets application request data and then the determined required secrets are obtained from the secure secrets cache at THE SECURE SECRETS PROXY OBTAINS THE SECRETS ASSOCIATED WITH THE SECRETS APPLICATION REQUEST DATA FROM THE SECURE SECRETS CACHE OPERATION 323, process flow proceeds to THE SECURE SECRETS PROXY COORDINATES THE APPLICATION OF THE SECRETS ASSOCIATED WITH THE SECRETS APPLICATION REQUEST DATA TO THE SECOND VIRTUAL ASSET DATA OPERATION 325

In one embodiment, at THE SECURE SECRETS PROXY COORDINATES THE APPLICATION OF THE SECRETS ASSOCIATED WITH THE SECRETS APPLICATION REQUEST DATA TO THE SECOND VIRTUAL ASSET DATA OPERATION 325 the secure secrets proxy proceeds to coordinate the application of the secrets associated with the secrets application request data of THE SECURE SECRETS PROXY OBTAINS THE SECRETS ASSOCIATED WITH THE SECRETS APPLICATION REQUEST DATA FROM THE SECURE SECRETS CACHE OPERATION 323 on, or to, the second virtual asset data of THE SECURE SECRETS PROXY RECEIVES THE SECRETS APPLICATION REQUEST DATA OPERATION 319.

In one embodiment, once the required secrets are applied to the second virtual asset data, the second virtual asset data is stored in accordance with any directions received from the second virtual asset.

In one embodiment, once the secure secrets proxy coordinates the application of the secrets associated with the secrets application request data on, or to, the second virtual asset data at THE SECURE SECRETS PROXY COORDINATES THE APPLICATION OF THE SECRETS ASSOCIATED WITH THE SECRETS APPLICATION REQUEST DATA TO THE SECOND VIRTUAL ASSET DATA OPERATION 325, process flow proceeds to EXIT OPERATION 330.

In one embodiment, at EXIT OPERATION 330 process 300 for providing a secure secrets proxy is exited to await new data.

Using process 300 for providing a secure secrets proxy discussed above, the management and application of secrets data becomes a highly automated process performed under the orchestration of a secure secrets proxy that is instantiated in the computing environment where the data to which secrets are to be applied is generated. In addition, the secure secrets proxy discussed herein acts as both a local cache for secrets data, thereby minimizing latencies associated with obtaining secure secrets, and a trusted intermediary between the computing environment where the secrets are to be applied and the computing environment of a secrets distribution management system, and/or where the secrets are stored. Consequently, process 300 for providing a secure secrets proxy discussed herein provides for the management of secrets data, and the application of the secrets data, in a highly automated manner that minimizes latencies and can operate in multiple environments, without compromising the secrets, the resources accessed using the secrets, and/or any data or objects associated with the secrets.

In various embodiments, the secure secrets proxy is an encryption proxy used to manage and apply encryption keys in the computing environment where the encryption proxy is instantiated.

In accordance with one embodiment, a method and system for providing an encryption proxy includes providing an encryption proxy in a first computing environment. In one embodiment, the encryption proxy is a virtual asset instantiated in the first computing environment. In one embodiment, the encryption proxy includes encryption proxy authentication data for identifying the encryption proxy as a trusted virtual asset in the first computing environment.

In one embodiment, a secrets distribution management system is provided in a second computing environment. In one embodiment, the secrets distribution management system has access to encryption key data representing one or more encryption keys and controls the distribution of the one or more encryption keys in accordance with one or more encryption key distribution policies. In one embodiment, the encryption proxy provides the encryption proxy authentication data to the secrets distribution management system and the secrets distribution management system authenticates the encryption proxy and identifies the encryption proxy as a trusted virtual asset eligible to cache encryption key data in an encryption key cache outside the second computing environment.

In one embodiment, based, in part, on the type of computing environment represented by the first computing environment, the encryption proxy generates cache encryption key request data representing a request for data representing one or more requested encryption keys to be cached in the encryption key cache. In one embodiment, the encryption proxy provides the cache encryption key request data to the secrets distribution management system and, in response to the cache encryption key request data, the secrets distribution management system provides data representing the one or more requested encryption keys to the encryption key cache.

In one embodiment, a second virtual asset instantiated in the first computing environment generates encryption/decryption request data requesting second virtual asset data generated by, or through, or otherwise associated with, the second virtual asset be encrypted/decrypted. In one embodiment, the encryption proxy receives the encryption/decryption request data and then the encryption proxy authenticates the second virtual asset. In one embodiment, the encryption proxy then obtains the encryption keys associated with the encryption/decryption request data from the encryption key cache and the encryption proxy coordinates the encryption or decryption of the second virtual asset data.

Figure 5:
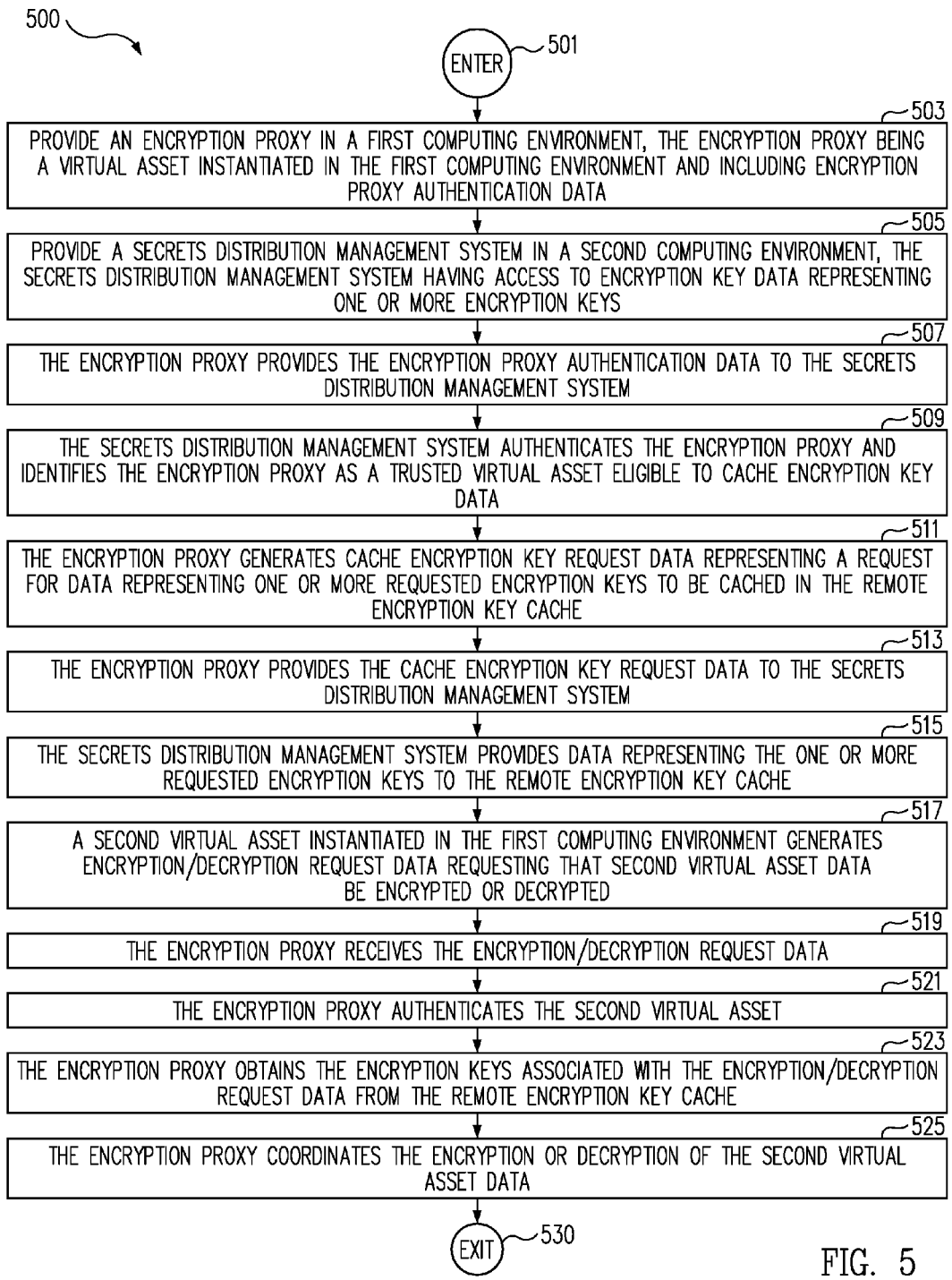
FIG. 5 is a flow chart depicting a process for providing an encryption proxy in accordance with one embodiment.

FIG. 5 is a flow chart of a process 500 for providing an encryption proxy in accordance with one embodiment. In one embodiment, process 500 for providing a secure secrets proxy begins at ENTER OPERATION 501 of FIG. 5 and process flow proceeds to PROVIDE AN ENCRYPTION PROXY IN A FIRST COMPUTING ENVIRONMENT, THE ENCRYPTION PROXY BEING A VIRTUAL ASSET INSTANTIATED IN THE FIRST COMPUTING ENVIRONMENT AND INCLUDING ENCRYPTION PROXY AUTHENTICATION DATA OPERATION 503.

In various embodiments, at PROVIDE AN ENCRYPTION PROXY IN A FIRST COMPUTING ENVIRONMENT, THE ENCRYPTION PROXY BEING A VIRTUAL ASSET INSTANTIATED IN THE FIRST COMPUTING ENVIRONMENT AND INCLUDING ENCRYPTION PROXY AUTHENTICATION DATA OPERATION 503 an encryption proxy is provided in a first computing environment.

In one embodiment, the encryption proxy of PROVIDE AN ENCRYPTION PROXY IN A FIRST COMPUTING ENVIRONMENT, THE ENCRYPTION PROXY BEING A VIRTUAL ASSET INSTANTIATED IN THE FIRST COMPUTING ENVIRONMENT AND INCLUDING ENCRYPTION PROXY AUTHENTICATION DATA OPERATION 503 is a virtual asset instantiated in the first computing environment. In one embodiment, as a specific illustrative example, the encryption proxy is a virtual machine, or server instance, instantiated in a cloud computing environment.

In one embodiment, the encryption proxy of PROVIDE AN ENCRYPTION PROXY IN A FIRST COMPUTING ENVIRONMENT, THE ENCRYPTION PROXY BEING A VIRTUAL ASSET INSTANTIATED IN THE FIRST COMPUTING ENVIRONMENT AND INCLUDING ENCRYPTION PROXY AUTHENTICATION DATA OPERATION 503 is instantiated in the first computing environment using a virtual machine template through which the creator of the encryption proxy can assign resources and attributes to the encryption proxy. In one embodiment, the virtual machine template includes provided logic for generating and/or processing encryption proxy authentication data associated with the encryption proxy and identifying the encryption proxy as a trusted agent generated within the first computing environment.

In one embodiment, the encryption proxy authentication data includes one or more additional, or alternative, challenges, and/or responses to challenges, that are used to authenticate the encryption proxy and to further identify the encryption proxy as a trusted agent for receiving and/or caching one or more encryption keys. In one embodiment, the encryption proxy authentication data is used or provided to other entities as part of the bootstrap handshake with those entities at the time the encryption proxy is first instantiated in the first computing environment. As discussed below, in one embodiment the encryption proxy authentication data is provided to a secrets distribution management system in a second computing environment in order to authenticate the encryption proxy and identify the encryption proxy as a trusted asset in the first computing environment eligible to receive, and/or cache, one or more encryption keys. In one embodiment, the encryption proxy authentication data is provided in addition to standard authentication procedures performed with an initial set of credentials.

In one embodiment the one or more additional or alternative challenges included in the encryption proxy authentication data includes automatically loading specified datum from a specified storage service onto the encryption proxy and then providing the specified datum to an entity needing to confirm the identity of the encryption proxy as a trusted virtual asset eligible to receive and/or cache encryption keys.

In one embodiment, the one or more additional or alternative challenges included in the encryption proxy authentication data includes data for reading or obtaining hardware identification data indicating the identification of the underlying hardware on which the encryption proxy virtual machine is running. In one embodiment, the hardware identification data is then confirmed by comparing it with data obtained via other systems, such as a cloud provider control plane.

In one embodiment, once an encryption proxy is provided in a first computing environment at PROVIDE AN ENCRYPTION PROXY IN A FIRST COMPUTING ENVIRONMENT, THE ENCRYPTION PROXY BEING A VIRTUAL ASSET INSTANTIATED IN THE FIRST COMPUTING ENVIRONMENT AND INCLUDING ENCRYPTION PROXY AUTHENTICATION DATA OPERATION 503, process flow proceeds to PROVIDE A SECRETS DISTRIBUTION MANAGEMENT SYSTEM IN A SECOND COMPUTING ENVIRONMENT, THE SECRETS DISTRIBUTION MANAGEMENT SYSTEM HAVING ACCESS TO ENCRYPTION KEY DATA REPRESENTING ONE OR MORE ENCRYPTION KEYS OPERATION 505.

In one embodiment, at PROVIDE A SECRETS DISTRIBUTION MANAGEMENT SYSTEM IN A SECOND COMPUTING ENVIRONMENT, THE SECRETS DISTRIBUTION MANAGEMENT SYSTEM HAVING ACCESS TO ENCRYPTION KEY DATA REPRESENTING ONE OR MORE ENCRYPTION KEYS OPERATION 505 a secrets distribution management system is provided in a second computing environment that, in one embodiment, is distinct from the first computing environment in which the encryption proxy is instantiated.

In one embodiment, the secrets distribution management system of PROVIDE A SECRETS DISTRIBUTION MANAGEMENT SYSTEM IN A SECOND COMPUTING ENVIRONMENT, THE SECRETS DISTRIBUTION MANAGEMENT SYSTEM HAVING ACCESS TO ENCRYPTION KEY DATA REPRESENTING ONE OR MORE ENCRYPTION KEYS OPERATION 505 has access to encryption key data representing one or more encryption keys and controls the distribution of the one or more encryption keys in accordance with one or more encryption key distribution policies. In accordance with one embodiment, the encryption key data representing one or more encryption keys is obtained, and/or accessed through, the secrets distribution management system.

In one embodiment, the secrets distribution management system is Hardware Security Module (HSM).

Given the sensitive nature of the encryption keys represented by the encryption key data, it is fundamental that the encryption key data be kept secure and only be released to entities, such as virtual assets, that are authenticated and legitimately qualified to receive encryption keys, and specific authorized encryption keys. To this end, the secrets distribution management system controls the distribution of the encryption key data in accordance with one or more encryption key distribution polices and one or more encryption key distribution factors used to control the distribution of the one or more encryption keys.

In one embodiment, the encryption key distribution factors include one or more checks or tests to be performed on virtual assets requesting encryption key data that allow for a determination as to what encryption keys the requesting virtual asset legitimately needs.

In various embodiments, the encryption key distribution policy data is open-endedly defined such that the encryption key distribution policy, and/or encryption key distribution factors, can be defined by the one or more parties associated with the distribution of the secrets, such as, but not limited to, the owner of a data center keeping or accessing the encryption key data, the owner or provider of a cloud, the owner or a provider of a service, the owner or provider of one or more resources accessible using the encryption key data, and/or any other party legitimately authorized to control the distribution of secrets. In this way, using process 500 for providing an encryption proxy, the encryption key distribution policy can be tailored to the specific needs of the one or more parties associated with the distribution of the secrets. In addition, the secrets distribution policies, and/or encryption key distribution factors, can be added, modified, or deleted, as needed to meet the needs of the one or more parties associated with the distribution of secrets.

In one embodiment, once a secrets distribution management system is provided in a second computing environment that, in one embodiment, is distinct from the first computing environment in which the encryption proxy is instantiated at PROVIDE A SECRETS DISTRIBUTION MANAGEMENT SYSTEM IN A SECOND COMPUTING ENVIRONMENT, THE SECRETS DISTRIBUTION MANAGEMENT SYSTEM HAVING ACCESS TO ENCRYPTION KEY DATA REPRESENTING ONE OR MORE ENCRYPTION KEYS OPERATION 505, process flow proceeds to THE ENCRYPTION PROXY PROVIDES THE ENCRYPTION PROXY AUTHENTICATION DATA TO THE SECRETS DISTRIBUTION MANAGEMENT SYSTEM OPERATION 507.

In one embodiment, at THE ENCRYPTION PROXY PROVIDES THE ENCRYPTION PROXY AUTHENTICATION DATA TO THE SECRETS DISTRIBUTION MANAGEMENT SYSTEM OPERATION 507 the encryption proxy authentication data is provided to the secrets distribution management system by the encryption proxy.

In one embodiment, once the encryption proxy authentication data is provided to the secrets distribution management system by the encryption proxy at THE ENCRYPTION PROXY PROVIDES THE ENCRYPTION PROXY AUTHENTICATION DATA TO THE SECRETS DISTRIBUTION MANAGEMENT SYSTEM OPERATION 507, process flow proceeds to THE SECRETS DISTRIBUTION MANAGEMENT SYSTEM AUTHENTICATES THE ENCRYPTION PROXY AND IDENTIFIES THE ENCRYPTION PROXY AS A TRUSTED VIRTUAL ASSET ELIGIBLE TO CACHE ENCRYPTION KEY DATA OPERATION 509.

In one embodiment, at THE SECRETS DISTRIBUTION MANAGEMENT SYSTEM AUTHENTICATES THE ENCRYPTION PROXY AND IDENTIFIES THE ENCRYPTION PROXY AS A TRUSTED VIRTUAL ASSET ELIGIBLE TO CACHE ENCRYPTION KEY DATA OPERATION 509, in response to the encryption proxy authentication data of THE ENCRYPTION PROXY PROVIDES THE ENCRYPTION PROXY AUTHENTICATION DATA TO THE SECRETS DISTRIBUTION MANAGEMENT SYSTEM OPERATION 507, the secrets distribution management system authenticates the encryption proxy and confirms the identification of the encryption proxy as a trusted virtual asset in the first computing environment for receiving and/or caching secrets controlled by the secrets distribution management system.

In one embodiment, once the secrets distribution management system authenticates the encryption proxy and confirms the identification of the encryption proxy as a trusted virtual asset in the first computing environment for receiving and/or caching secrets controlled by the secrets distribution management system at THE SECRETS DISTRIBUTION MANAGEMENT SYSTEM AUTHENTICATES THE ENCRYPTION PROXY AND IDENTIFIES THE ENCRYPTION PROXY AS A TRUSTED VIRTUAL ASSET ELIGIBLE TO CACHE ENCRYPTION KEY DATA OPERATION 509, process flow proceeds to THE ENCRYPTION PROXY GENERATES CACHE ENCRYPTION KEY REQUEST DATA REPRESENTING A REQUEST FOR DATA REPRESENTING ONE OR MORE REQUESTED ENCRYPTION KEYS TO BE CACHED IN THE REMOTE ENCRYPTION KEY CACHE OPERATION 511

In one embodiment, at THE ENCRYPTION PROXY GENERATES CACHE ENCRYPTION KEY REQUEST DATA REPRESENTING A REQUEST FOR DATA REPRESENTING ONE OR MORE REQUESTED ENCRYPTION KEYS TO BE CACHED IN THE REMOTE ENCRYPTION KEY CACHE OPERATION 511 the encryption proxy generates cache encryption key request data representing a request for data representing one or more requested encryption keys controlled by the secrets distribution management system to be cached in an encryption key cache outside the second computing system environment of the secrets distribution management system.

As a specific example, in one embodiment, the encryption proxy is a virtual machine instance in a cloud computing environment which generates cache encryption key request data representing a request for data representing one or more requested encryption keys controlled by the secrets distribution management system in a data center to be cached by the encryption proxy within the cloud computing environment, or in a data store outside the data center and/or the cloud computing environment.

In one embodiment, once the encryption proxy generates cache encryption key request data representing a request for data representing one or more requested encryption keys controlled by the secrets distribution management system to be cached in an encryption key cache outside the second computing system environment of the secrets distribution management system at THE ENCRYPTION PROXY GENERATES CACHE ENCRYPTION KEY REQUEST DATA REPRESENTING A REQUEST FOR DATA REPRESENTING ONE OR MORE REQUESTED ENCRYPTION KEYS TO BE CACHED IN THE REMOTE ENCRYPTION KEY CACHE OPERATION 511, process flow proceeds to THE ENCRYPTION PROXY PROVIDES THE CACHE ENCRYPTION KEY REQUEST DATA TO THE SECRETS DISTRIBUTION MANAGEMENT SYSTEM OPERATION 513

In one embodiment, at THE ENCRYPTION PROXY PROVIDES THE CACHE ENCRYPTION KEY REQUEST DATA TO THE SECRETS DISTRIBUTION MANAGEMENT SYSTEM OPERATION 513 the cache encryption key request data is provided to the secrets distribution management system by the encryption proxy.

In one embodiment, at THE ENCRYPTION PROXY PROVIDES THE CACHE ENCRYPTION KEY REQUEST DATA TO THE SECRETS DISTRIBUTION MANAGEMENT SYSTEM OPERATION 513 the cache encryption key request data is provided to the secrets distribution management system via a secure communications channel, such as an authenticated Secure Sockets Layer (SSL) communication channel, and/or any other private communications channel.

In one embodiment, once the cache encryption key request data is provided to the secrets distribution management system by the encryption proxy at THE ENCRYPTION PROXY PROVIDES THE CACHE ENCRYPTION KEY REQUEST DATA TO THE SECRETS DISTRIBUTION MANAGEMENT SYSTEM OPERATION 513, process flow proceeds to THE SECRETS DISTRIBUTION MANAGEMENT SYSTEM PROVIDES DATA REPRESENTING THE ONE OR MORE REQUESTED ENCRYPTION KEYS TO THE REMOTE ENCRYPTION KEY CACHE OPERATION 515.

In one embodiment, at THE SECRETS DISTRIBUTION MANAGEMENT SYSTEM PROVIDES DATA REPRESENTING THE ONE OR MORE REQUESTED ENCRYPTION KEYS TO THE REMOTE ENCRYPTION KEY CACHE OPERATION 515 in response to the cache encryption key request data, and in light of the encryption proxy authentication and identification as a trusted virtual asset, the secrets distribution management system provides data representing the one or more requested encryption keys of the cache encryption key request data to the control of the encryption proxy and/or the encryption key cache.

In various embodiments, the encryption key cache of THE SECRETS DISTRIBUTION MANAGEMENT SYSTEM PROVIDES DATA REPRESENTING THE ONE OR MORE REQUESTED ENCRYPTION KEYS TO THE REMOTE ENCRYPTION KEY CACHE OPERATION 515 is an encryption key data store located outside the second computing environment of the secrets distribution management system. In one embodiment the encryption key data store of THE SECRETS DISTRIBUTION MANAGEMENT SYSTEM PROVIDES DATA REPRESENTING THE ONE OR MORE REQUESTED ENCRYPTION KEYS TO THE REMOTE ENCRYPTION KEY CACHE OPERATION 515 is also located outside the first computing environment of the encryption proxy. In these embodiments, the encryption proxy is provided access to the one or more encryption keys cached in the encryption key data store so that the encryption proxy can access and/or transfer data representing the one or more encryption keys as needed.

In other embodiments, the encryption key cache of THE SECRETS DISTRIBUTION MANAGEMENT SYSTEM PROVIDES DATA REPRESENTING THE ONE OR MORE REQUESTED ENCRYPTION KEYS TO THE REMOTE ENCRYPTION KEY CACHE OPERATION 515 is a cache within the encryption proxy. Consequently, in these embodiments, the data representing the one or more encryption keys is maintained in the encryption proxy.

In one embodiment, once the secrets distribution management system provides data representing the one or more requested encryption keys of the cache encryption key request data to the control of the encryption proxy and/or the encryption key cache at THE SECRETS DISTRIBUTION MANAGEMENT SYSTEM PROVIDES DATA REPRESENTING THE ONE OR MORE REQUESTED ENCRYPTION KEYS TO THE REMOTE ENCRYPTION KEY CACHE OPERATION 515, process flow proceeds to A SECOND VIRTUAL ASSET INSTANTIATED IN THE FIRST COMPUTING ENVIRONMENT GENERATES ENCRYPTION/DECRYPTION REQUEST DATA REQUESTING THAT SECOND VIRTUAL ASSET DATA BE ENCRYPTED OR DECRYPTED OPERATION 517.

In one embodiment, at A SECOND VIRTUAL ASSET INSTANTIATED IN THE FIRST COMPUTING ENVIRONMENT GENERATES ENCRYPTION/DECRYPTION REQUEST DATA REQUESTING THAT SECOND VIRTUAL ASSET DATA BE ENCRYPTED OR DECRYPTED OPERATION 517 a second virtual asset instantiated in the first computing environment of the encryption proxy, generates encryption/decryption request data requesting the encryption or decryption of second virtual asset data generated by, and/or through, and/or otherwise associated with, the second virtual asset.

In one embodiment, once a second virtual asset instantiated in the first computing environment of the encryption proxy, generates encryption/decryption request data requesting the encryption or decryption of second virtual asset data generated by, and/or through, and/or otherwise associated with, the second virtual asset at A SECOND VIRTUAL ASSET INSTANTIATED IN THE FIRST COMPUTING ENVIRONMENT GENERATES ENCRYPTION/DECRYPTION REQUEST DATA REQUESTING THAT SECOND VIRTUAL ASSET DATA BE ENCRYPTED OR DECRYPTED OPERATION 517, process flow proceeds to THE ENCRYPTION PROXY RECEIVES THE ENCRYPTION/DECRYPTION REQUEST DATA OPERATION 519, In one embodiment, at THE ENCRYPTION PROXY RECEIVES THE ENCRYPTION/DECRYPTION REQUEST DATA OPERATION 519 the encryption/decryption request from the second virtual asset is received by the encryption proxy.

In one embodiment, at THE ENCRYPTION PROXY RECEIVES THE ENCRYPTION/DECRYPTION REQUEST DATA OPERATION 519 the encryption proxy is also provided the second virtual asset data and, in one embodiment, data indicating instructions for storing the encrypted/decrypted second virtual asset data once the second virtual asset data has been encrypted or decrypted.

In one embodiment, once the encryption/decryption request from the second virtual asset is received by the encryption proxy at THE ENCRYPTION PROXY RECEIVES THE ENCRYPTION/DECRYPTION REQUEST DATA OPERATION 519, process flow proceeds to THE ENCRYPTION PROXY AUTHENTICATES THE SECOND VIRTUAL ASSET OPERATION 521.

In one embodiment, at THE ENCRYPTION PROXY AUTHENTICATES THE SECOND VIRTUAL ASSET OPERATION 521 the encryption proxy authenticates the second virtual asset and determines if encryption/decryption request is appropriate for the second virtual asset.

In one embodiment, at THE ENCRYPTION PROXY AUTHENTICATES THE SECOND VIRTUAL ASSET OPERATION 521 the encryption proxy authenticates the second virtual asset and determines if the encryption/decryption request is appropriate using the one or more encryption key distribution factors included in the encryption key distribution policy.

As noted above, the encryption key distribution factors include one or more checks or tests to be performed on virtual assets that allow for a determination as to the nature of the virtual asset and what secrets and processes are legitimately associated with that virtual asset.

As discussed above, in one embodiment, each virtual asset in a computing environment is assigned a given role. In one embodiment, as part of the encryption key distribution policy, the secrets that can be provided to each role are defined. In one embodiment, these roles are defined in secrets meta-data.

In light of this fact, in one embodiment, at THE ENCRYPTION PROXY AUTHENTICATES THE SECOND VIRTUAL ASSET OPERATION 521 the encryption proxy authenticates the second virtual asset and determines if encryption/decryption request is appropriate for the second virtual asset based on the role, or roles, assigned to the second virtual asset.

In one embodiment, once the encryption proxy authenticates the second virtual asset and determines if encryption/decryption request is appropriate for the second virtual asset at THE ENCRYPTION PROXY AUTHENTICATES THE SECOND VIRTUAL ASSET OPERATION 521, process flow proceeds to THE ENCRYPTION PROXY OBTAINS THE ENCRYPTION KEYS ASSOCIATED WITH THE ENCRYPTION/DECRYPTION REQUEST DATA FROM THE REMOTE ENCRYPTION KEY CACHE OPERATION 523.

In one embodiment, at THE ENCRYPTION PROXY OBTAINS THE ENCRYPTION KEYS ASSOCIATED WITH THE ENCRYPTION/DECRYPTION REQUEST DATA FROM THE REMOTE ENCRYPTION KEY CACHE OPERATION 523 the encryption proxy determines what encryption keys are required to comply with the encryption/decryption request and then the determined required encryption keys are obtained from the encryption key cache.

In one embodiment, once the encryption proxy determines what encryption keys are required to comply with the encryption/decryption request and then the determined required encryption keys are obtained from the encryption key cache at THE ENCRYPTION PROXY OBTAINS THE ENCRYPTION KEYS ASSOCIATED WITH THE ENCRYPTION/DECRYPTION REQUEST DATA FROM THE REMOTE ENCRYPTION KEY CACHE OPERATION 523, process flow proceeds to THE ENCRYPTION PROXY COORDINATES THE ENCRYPTION OR DECRYPTION OF THE SECOND VIRTUAL ASSET DATA OPERATION 525.

In one embodiment, at THE ENCRYPTION PROXY COORDINATES THE ENCRYPTION OR DECRYPTION OF THE SECOND VIRTUAL ASSET DATA OPERATION 525 the encryption proxy coordinates the encryption or decryption of the second virtual asset data.

In one embodiment, at THE ENCRYPTION PROXY COORDINATES THE ENCRYPTION OR DECRYPTION OF THE SECOND VIRTUAL ASSET DATA OPERATION 525 the encryption proxy coordinates the encryption or decryption of the second virtual asset data performed by an encryption engine implemented in the first computing environment.

In one embodiment, at THE ENCRYPTION PROXY COORDINATES THE ENCRYPTION OR DECRYPTION OF THE SECOND VIRTUAL ASSET DATA OPERATION 525 the encryption proxy coordinates the encryption or decryption of the second virtual asset data performed by an encryption engine implemented outside the first computing environment.

In one embodiment, at THE ENCRYPTION PROXY COORDINATES THE ENCRYPTION OR DECRYPTION OF THE SECOND VIRTUAL ASSET DATA OPERATION 525 the encryption proxy coordinates the encryption or decryption of the second virtual asset data performed by an encryption engine implemented on the second virtual asset.

In one embodiment, at THE ENCRYPTION PROXY COORDINATES THE ENCRYPTION OR DECRYPTION OF THE SECOND VIRTUAL ASSET DATA OPERATION 525 the encryption proxy coordinates the encryption or decryption of the second virtual asset data performed by the encryption proxy.

In one embodiment, at THE ENCRYPTION PROXY COORDINATES THE ENCRYPTION OR DECRYPTION OF THE SECOND VIRTUAL ASSET DATA OPERATION 525 the encryption proxy coordinates the encryption or decryption of the second virtual asset data in accordance with defined encryption policy.

As a specific illustrative example, the length of the encryption keys requested and applied at THE ENCRYPTION PROXY COORDINATES THE ENCRYPTION OR DECRYPTION OF THE SECOND VIRTUAL ASSET DATA OPERATION 525 is determined in accordance to the laws of a given country. As another example, the kind of encryption applied, e.g., symmetric or asymmetric, is determined in accordance with defined encryption policy.

In one embodiment, once the encryption or decryption of the second virtual asset data is complete, the encrypted or decrypted second virtual asset data is stored in accordance with any directions received from the second virtual asset.

In one embodiment, the second virtual asset data is an object and at THE ENCRYPTION PROXY COORDINATES THE ENCRYPTION OR DECRYPTION OF THE SECOND VIRTUAL ASSET DATA OPERATION 525 the encryption proxy coordinates object level encryption or decryption of the second virtual asset object. In one embodiment, once the encryption proxy coordinates object level encryption of the second virtual asset object, the encryption proxy coordinates the storing the object encrypted second virtual asset object in an object store at THE ENCRYPTION PROXY COORDINATES THE ENCRYPTION OR DECRYPTION OF THE SECOND VIRTUAL ASSET DATA OPERATION 525.

In one embodiment, once the encryption proxy coordinates the encryption or decryption of the second virtual asset data at THE ENCRYPTION PROXY COORDINATES THE ENCRYPTION OR DECRYPTION OF THE SECOND VIRTUAL ASSET DATA OPERATION 525, process flow proceeds to EXIT OPERATION 530.

In one embodiment, at EXIT OPERATION 530 process 500 for providing a secure secrets proxy is exited to await new data.

Using the process 500 for providing an encryption proxy discussed above, management of encryption key data and the encryption or decryption of data becomes a highly automated process performed under the orchestration of an encryption proxy that is instantiated in the computing environment where the encryption or decryption takes place. In addition, the encryption proxy discussed herein acts as both a local cache for encryption key data, thereby minimizing latencies associated with obtaining encryption key data, and a trusted intermediary between the computing environment where the encryption or decryption is taking place and the computing environment of a secrets distribution management system, and/or where the encryption keys are stored. Consequently, process 500 for providing an encryption proxy discussed herein provides for the management of encryption key data, and the application of the encryption key data, in a highly automated manner that minimizes latencies and can operate in multiple environments, without compromising the encryption keys, the resources accessed using the encryption keys, and/or any data or objects encrypted or decrypted.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for providing a secure secrets proxy comprising:
   at least one processor; and
   at least one memory coupled to the at least one processor, the at least one memory having stored therein instructions which when executed by any set of the one or more processors, perform a process for providing a secure secrets proxy, the process for providing a secure secrets proxy including:
   providing a secure secrets proxy in a first computing environment, the secure secrets proxy being a virtual asset instantiated in the first computing environment, the first computing environment being a cloud environment, the virtual asset being an instance of dynamically allocatable computing resources that are instantiated in the cloud environment, the secure secrets proxy enabling secure decentralization of secrets data from a second computing environment to the cloud environment to decrease access latency for the secrets data from the cloud environment, the secure secrets proxy including secure secrets proxy authentication data, the secure secrets proxy authentication data for identifying the secure secrets proxy as a trusted virtual asset in the first computing environment, the secure secrets proxy authentication data including hardware identification data identifying underlying hardware on which the secure secrets proxy is running;
   providing a secrets distribution management system, the secrets distribution management system being in the second computing environment, the secrets distribution management system having access to the secrets data representing one or more secrets, the secrets distribution management system controlling the distribution of the one or more secrets in accordance with one or more secrets distribution policies;
   the secure secrets proxy providing the secure secrets proxy authentication data to the secrets distribution management system;
   the secrets distribution management system authenticating the secure secrets proxy by comparing the hardware identification data with data obtained via a cloud provider of the cloud environment;
   the secrets distribution management system identifying the secure secrets proxy as a trusted virtual asset eligible to cache secrets data in a secure secrets cache outside the second computing environment, the secure secrets cache being a data store that is outside the second computing environment;
   the secure secrets proxy generating cache secrets request data representing a request for data representing one or more requested secrets to be cached in the secure secrets cache;
   the secure secrets proxy providing the cache secrets request data to the secrets distribution management system; and
   in response to the cache secrets request data, the secrets distribution management system providing data representing the one or more requested secrets to the secure secrets cache.

2. The system for providing a secure secrets proxy of claim 1 wherein the first computing environment is an untrusted computing environment.

3. The system for providing a secure secrets proxy of claim 1 wherein the secure secrets proxy is a virtual asset generated in the untrusted computing environment.

4. The system for providing a secure secrets proxy of claim 1 wherein the second computing environment is a trusted computing environment.

5. The system for providing a secure secrets proxy of claim 1 wherein the second computing environment is a data center network.

6. The system for providing a secure secrets proxy of claim 1 wherein the secure secrets proxy authentication data includes data representing an authentication mechanism consisting of:
   loading specified datum from a specified storage service onto the secure secrets proxy and then providing the specified datum to confirm the identity of the secure secrets proxy.

7. The system for providing a secure secrets proxy of claim 1 wherein the secrets data includes data representing one or more secrets selected from the group of secrets consisting of:
   usernames;
   passwords;
   passphrases;
   encryption keys;
   digital certificates;
   multifactor authentication data;
   account numbers;
   identification numbers; and
   any combination thereof.

8. The system for providing a secure secrets proxy of claim 1 wherein the one or more requested secrets to be cached in the secure secrets cache are selected by the secure secrets proxy based on the type of computing environment represented by the first computing environment.

9. The system for providing a secure secrets proxy of claim 1 wherein the one or more requested secrets to be cached in the secure secrets cache are selected by the secure secrets proxy based on the types of virtual assets in the first computing environment.

10. The system for providing a secure secrets proxy of claim 1 wherein the one or more requested secrets to be cached in the secure secrets cache are selected by the secure secrets proxy based on the capabilities of the virtual assets in the first computing environment.

11. The system for providing a secure secrets proxy of claim 1 wherein the one or more requested secrets to be cached in the secure secrets cache are selected by the secure secrets proxy based on the reputation profiles of the virtual assets in the first computing environment.

12. The system for providing a secure secrets proxy of claim 1 wherein the one or more requested secrets to be cached in the secure secrets cache are selected by the secure secrets proxy based on the resources associated with the virtual assets in the first computing environment.

13. The system for providing a secure secrets proxy of claim 1 wherein the secure secrets proxy provides the secure secrets proxy authentication data to the secrets distribution management system via a secure communications channel.

14. The system for providing a secure secrets proxy of claim 13 wherein the secure communications channel is an authenticated Secure Sockets Layer (SSL) communications channel.

15. The system for providing a secure secrets proxy of claim 13 wherein the secure communications channel is any private communications channel.

16. The system for providing a secure secrets proxy of claim 1 wherein the secure secrets cache is a secrets data store outside the second computing environment.

17. The system for providing a secure secrets proxy of claim 1 wherein the secure secrets cache is a data cache in the secure secrets proxy.

18. The system for providing a secure secrets proxy of claim 1 further comprising:
 a second virtual asset instantiated in the first computing environment, the second virtual asset generating secrets application request data requesting that one or more secrets be applied to second virtual asset data associated with the second virtual asset;
 the secure secrets proxy receiving the secrets application request data;
 the secure secrets proxy authenticating the second virtual asset;
 the secure secrets proxy obtaining the secrets associated with the secrets application request data from the secure secrets cache; and
 the secure secrets proxy coordinating the application of the secrets associated with the secrets application request data to the second virtual asset data.

19. The system for providing a secure secrets proxy of claim 18 wherein the second virtual asset is a virtual asset selected from the group of the virtual assets consisting of:
 a virtual machine;
 a virtual server;
 an instance in a cloud infrastructure;
 a cloud infrastructure access system;
 a mobile device;
 a remote sensor;
 a laptop;
 a desktop;
 a point-of-sale device;
 an ATM;
 an electronic voting machine; and
 a database.

20. A secure secrets proxy, the secure secrets proxy being a virtual asset instantiated in a first computing environment, the secure secrets proxy including:
 secure secrets proxy authentication logic, the secure secrets proxy authentication logic for generating secure secrets proxy authentication data identifying the secure secrets proxy as a trusted virtual asset in the first computing environment, the first computing environment being a cloud environment, the trusted virtual asset being an instance of dynamically allocatable computing resources that are instantiated in the cloud environment, the secure secrets proxy enabling secure decentralization of secrets data from a second computing environment to the cloud environment to decrease access latency for the secrets data from within the cloud environment, the secure secrets proxy authentication data including hardware identification data identifying underlying hardware on which the secure secrets proxy is running;
 a secrets distribution management system in the second computing environment, the secrets distribution management system having access to the secrets data representing one or more secrets, the secrets distribution management system controlling the distribution of the one or more secrets in accordance with one or more secrets distribution policies, the secrets distribution management system authenticating the secure secrets proxy as the trusted virtual asset by comparing the hardware identification data with data obtained via a cloud provider of the cloud environment;
 a secure secrets cache that is a data store that is outside of the second computing environment;
 secure secrets proxy cache secrets request data generation logic for generating cache secrets request data representing a request for data representing one or more requested secrets to be cached in the secure secrets cache;
 secure secrets proxy cache secrets request data transmission logic for providing the cache secrets request data to the secrets distribution management system; and
 requested secrets receipt and caching logic for receiving and storing data representing the one or more requested secrets to be cached in the secure secrets cache.

21. The secure secrets proxy of claim 20 further comprising:
 secure secrets proxy secrets application request data receipt logic for receiving secrets application request data from a second virtual asset instantiated in the first computing environment, the second virtual asset requiring the application of one or more secrets to second virtual asset data provided through the second virtual asset, the secrets application request data representing a request that one or more secrets be applied to the second virtual asset data;
 secure secrets proxy cached secrets retrieval logic for retrieving the secrets associated with the secrets application request data from the secure secrets cache;
 secure secrets proxy secrets application logic for coordinating the application of the secrets associated with the secrets application request data to the second virtual asset data.

* * * * *